United States Patent
Yang et al.

(10) Patent No.: US 9,703,414 B2
(45) Date of Patent: Jul. 11, 2017

(54) PIXEL CIRCUIT, ORGANIC ELECTROLUMINESCENT DISPLAY PANEL AND DISPLAY APPARATUS

(71) Applicants: BOE Technology Group Co., Ltd., Beijing (CN); Beijing BOE Optoelectronics Technology Co., Ltd., Beijing (CN)

(72) Inventors: Shengji Yang, Beijing (CN); Xue Dong, Beijing (CN); Haisheng Wang, Beijing (CN); Yingming Liu, Beijing (CN); Xiaoliang Ding, Beijing (CN); Weijie Zhao, Beijing (CN); Lei Wang, Beijing (CN); Chunlei Wang, Beijing (CN); Xiaobo Xie, Beijing (CN); Wei Li, Beijing (CN); Yang You, Beijing (CN); Ziwei Cui, Beijing (CN); Rui Xu, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 116 days.

(21) Appl. No.: 14/758,066

(22) PCT Filed: Sep. 26, 2014

(86) PCT No.: PCT/CN2014/087590
§ 371 (c)(1),
(2) Date: Jun. 26, 2015

(87) PCT Pub. No.: WO2016/000333
PCT Pub. Date: Jan. 7, 2016

(65) Prior Publication Data
US 2016/0266702 A1    Sep. 15, 2016

(30) Foreign Application Priority Data

Jun. 30, 2014    (CN) .......................... 2014 1 0305616

(51) Int. Cl.
*G06F 3/041*       (2006.01)
*G09G 3/32*        (2016.01)
(Continued)

(52) U.S. Cl.
CPC .......... G06F 3/0416 (2013.01); G06F 3/0412 (2013.01); G09G 3/2092 (2013.01);
(Continued)

(58) Field of Classification Search
CPC ...... G06F 3/041; G06F 3/0412; G06F 3/0416; G06F 3/044; G09G 3/2092;
(Continued)

(56) References Cited

U.S. PATENT DOCUMENTS

2010/0141644 A1    6/2010   Lee et al.
2014/0306867 A1*  10/2014  Qing .................... G09G 3/3233
                                                                345/76
(Continued)

FOREIGN PATENT DOCUMENTS

CN    1361510 A    7/2002
CN    1447302 A    10/2003
(Continued)

OTHER PUBLICATIONS

Apr. 1, 2015—International Search Report and Written Opinion Appn PCT/CN2014/087590 with Eng Tran.
(Continued)

*Primary Examiner* — Nathan Danielsen
(74) *Attorney, Agent, or Firm* — Banner & Witcoff, Ltd.

(57) ABSTRACT

The present disclosure discloses a pixel circuit, an organic electroluminescent display panel and a display apparatus,
(Continued)

and during a reset phase, under a control of a reset signal terminal (Rst), a touch detection unit and a light emitting control unit in the pixel circuit are reset respectively; during a touch read phase, under a control of a scanning signal terminal (Scan), the touch detection unit outputs a touch detection signal to a touch signal read terminal (Read), so as to implement a touch detection function, meanwhile the light emitting control unit is charged; and during a light emitting phase, under a control of a light emitting signal terminal (Em), the light emitting control unit drives a light emitting device to emit light, so as to implement a display driving function.

20 Claims, 13 Drawing Sheets

(51) Int. Cl.
  *G09G 3/20* (2006.01)
  *G09G 3/3241* (2016.01)
(52) U.S. Cl.
  CPC . *G09G 3/3241* (2013.01); *G06F 2203/04103* (2013.01); *G09G 2300/0842* (2013.01); *G09G 2300/0861* (2013.01); *G09G 2310/0262* (2013.01); *G09G 2354/00* (2013.01)

(58) Field of Classification Search
  CPC .................. G09G 3/32–3/3291; G09G 2300/0842–2300/0861; G09G 2310/0262
  See application file for complete search history.

(56) References Cited

U.S. PATENT DOCUMENTS

| | | | | |
|---|---|---|---|---|
| 2015/0325171 | A1* | 11/2015 | Zhou | G09G 3/3233 345/80 |
| 2016/0246424 | A1* | 8/2016 | Yang | G09G 3/3233 |

FOREIGN PATENT DOCUMENTS

| | | |
|---|---|---|
| CN | 102629447 A | 8/2012 |
| CN | 103236238 A | 8/2013 |
| CN | 103325341 A | 9/2013 |
| CN | 103345901 A | 10/2013 |
| CN | 103413523 A | 11/2013 |
| CN | 103456267 A | 12/2013 |
| CN | 203366705 U | 12/2013 |
| CN | 203503280 U | 3/2014 |
| CN | 104091564 A | 10/2014 |

OTHER PUBLICATIONS

Oct. 28, 2015—(CN)—First Office Action Appn 201410305616.X with Eng Tran.

* cited by examiner

PIXEL CIRCUIT, ORGANIC ELECTROLUMINESCENT DISPLAY PANEL AND DISPLAY APPARATUS

The application is a U.S. National Phase Entry of International Application No. PCT/CN2014/087590 filed on Sep. 26, 2014, designating the United States of America and claiming priority to Chinese Patent Application No. 201410305616.X, filed on Jun. 30, 2014. The present application claims priority to and the benefit of the above-identified applications and the above-identified applications are incorporated by reference herein in their entirety.

TECHNICAL FIELD

Embodiments of the present disclosure relate to a pixel circuit, an organic electroluminescent display panel and a display apparatus.

BACKGROUND

An Organic Light Emitting Display (OLED) is one of hot spots in the research field for current panel display, as compared with a Liquid Crystal Display (LCD), the OLED has advantages of low energy consumption, low production cost, auto-luminescence, wide angle of view and fast response speed etc.; in these days, OLED has gradually replaced the traditional LCD display screen in display field such as handset, PDA, and digital camera etc. Unlike the LCD which uses a stable voltage to control the brightness, the OLED is driven by a current, and requires a steady current to control its light emitting. Due to reasons such as processes and aging, there may be non-uniformity in threshold voltages $V_{th}$ of the drive transistors of the OLEDs, which may cause currents flowing through the OLEDs of the respective pixel points to be varied and further cause an uneven in displaying Brightness, and thus a displaying effect of an overall image may be affected. Accordingly, as known by the inventor, it is generally to dispose a light emitting control unit for eliminating the affection on the threshold voltage of the drive transistor in the pixel circuit.

With a development of the display device towards being lighter and thinner, higher resolution, intelligent, energy saving, a touch screen panel is used more widely. At present, an In-Cell touch panel is favored by many main panel manufactures, because its touch components are embedded into the display screen, which enables the overall thickness of the module to be thinned and also reduces the manufacturing cost of the touch screen greatly. In the In-Cell touch panel OLED display panel known to the inventor, generally circuits for implementing a display driving and a touch driving are designed separately; that is, one circuit is a touch detection circuit for implementing the touching function, and the other circuit is a pixel circuit for implementing the display driving function of the OLED. However, if the pixel circuit and the touch detection circuit are disposed separately, there may be defects of higher manufacturing cost, heavier and thicker display screen.

SUMMARY

Embodiments of the present disclosure provide a pixel circuit, an organic electroluminescent display panel and a display apparatus, so as to implement a pixel circuit integrating the functions of touch detection and displaying.

Accordingly, an embodiment of the present disclosure provides a pixel circuit, comprising: a touch detection unit, a light emitting device and a light emitting control unit; wherein, a first input terminal of the touch detection unit is connected with a data signal terminal, a second input terminal of the touch detection unit is connected with a touch signal input terminal, a first control terminal of the touch detection unit is connected with a reset signal terminal, a second control terminal of the touch detection unit is connected with a scanning signal terminal, and an output terminal of the touch detection unit is connected with a touch signal read terminal;

a first input terminal of the light emitting control unit is connected with the data signal terminal, a second input terminal of the light emitting control unit is connected with a high level signal terminal, a third input terminal of the light emitting control unit is connected with a reference signal terminal, a first control terminal of the light emitting control unit is connected with the reset signal terminal, a second control terminal of the light emitting control unit is connected with the scanning signal terminal, a third control terminal of the light emitting control unit is connected with a light emitting signal terminal, and an output terminal of the light emitting control unit is connected with the light emitting device;

during a reset phase, under a control of the reset signal terminal, the touch detection unit and the light emitting control unit are reset respectively; during a touch read phase, under a control of the scanning signal terminal, the touch detection unit outputs a touch detection signal to the touch signal read terminal, meanwhile the light emitting control unit is charged; and during a light emitting phase, under a control of the light emitting signal terminal, the light emitting control unit drives the light emitting device to emit light;

In the above-mentioned pixel circuit according to the embodiment of the present disclosure, during the reset phase, under the control of the reset signal terminal, the touch detection unit and the light emitting control unit are reset respectively; during the touch read phase, under the control of scanning signal terminal, the touch detection unit outputs the touch detection signal to the touch signal read terminal, so as to implement the touch detection function, meanwhile the light emitting control unit is charged; and during the light emitting phase, under the control of light emitting signal terminal, the light emitting control unit drives the light emitting device to emit light, so as to implement the display driving function. This pixel circuit integrates the functions of touch detection and displaying, thus the manufacturing cost of separately disposing the pixel circuit and the touch detection circuit may be saved, and the thickness of a display panel may also be reduced. And, in the pixel circuit according to the embodiment of the present disclosure, the touch detection unit and the light emitting control unit share the reset signal terminal, the data signal terminal and the scanning signal terminal, thus the wiring for ports in the pixel circuit may also be saved.

In one possible implementation, in the above-mentioned pixel circuit according to the embodiment of the present disclosure, the light emitting control unit comprises: a light emitting control module, a light emitting driving module, a light emitting reset module, and a light emitting charging module; wherein, an input terminal of the light emitting reset module is connected with the reference signal terminal; a control terminal of the light emitting reset module is connected with the reset signal terminal; and an output terminal of the light emitting reset module is connected with a control terminal of the light emitting driving module;

an input terminal of the light emitting charging module is connected with the data signal terminal, a control terminal of the light emitting charging module is connected with the scanning signal terminal, and an output terminal of the light emitting charging module is connected with a first input terminal of the light emitting driving module; a second input terminal of the light emitting driving module is connected with the high level signal terminal;

an input terminal of the light emitting control module is connected with an output terminal of the light emitting driving module; a control terminal of the light emitting control module is connected with the light emitting signal terminal; an output terminal of the light emitting control module is connected with the light emitting device;

during the reset phase, under the control of the reset signal terminal, the light emitting reset module resets the light emitting driving module; during the touch read phase, under the control of the scanning signal terminal, the light emitting charging module charges the light emitting driving module; and during the light emitting phase, under the control of the light emitting signal terminal, the light emitting control module controls the light emitting driving module to drive the light emitting device to emit light.

In one possible implementation, in the above-mentioned pixel circuit according to the embodiment of the present disclosure, the light emitting driving module comprises: a first drive transistor and a second drive transistor which are set in mirror image, and a memory capacitor; wherein, a source of the first drive transistor is connected with the output terminal of the light emitting charging module;

a drain of the first drive transistor, a gate of the first drive transistor, a gate of the second drive transistor are connected with the output terminal of the light emitting reset module respectively;

a source of the second drive transistor is connected with the high level signal terminal, and a drain of the second drive transistor is connected with the input terminal of the light emitting control module;

when both the first drive transistor and the second drive transistor are P type transistors, the reference signal terminal is a low level signal terminal, and the memory capacitor is connected between the gate and the source of the second drive transistor;

when both the first drive transistor and the second drive transistor are N type transistor, the reference signal terminal is the high level signal terminal, and the memory capacitor is connected between the gate and drain of the second drive transistor;

In one possible implementation, in the above-mentioned pixel circuit according to the embodiment of the present disclosure, the light emitting reset module comprises: a first switch transistor; wherein, a source of the first switch transistor is connected with the reference signal terminal, a gate of the first switch transistor is connected with the reset signal terminal, and a drain of the first switch transistor is the output terminal of the light emitting reset module.

In one possible implementation, in the above-mentioned pixel circuit according to the embodiment of the present disclosure, the light emitting charging module comprises: a second switch transistor; wherein, a source of the second switch transistor is connected with the data signal terminal, a gate of the second switch transistor is connected with the scanning signal terminal, and a drain of the second switch transistor is connected with the source of the first drive transistor.

In one possible implementation, in the above-mentioned pixel circuit according to the embodiment of the present disclosure, the light emitting control module comprises: a third switch transistor; wherein, a gate of the third switch transistor is connected with the light emitting signal terminal, a source of the third switch transistor is connected with the drain of the second drive transistor, and a drain of the third switch transistor is connected with the light emitting device.

In one possible implementation, in the above-mentioned pixel circuit according to the embodiment of the present disclosure, the touch detection unit comprises: a touch sensing module, a touch reset module, and a touch control module; wherein, an input terminal of the touch sensing module is connected with the touch signal input terminal; a control terminal of the touch sensing module is connected with an output terminal of the touch reset module, and an output terminal of the touch sensing module is connected with an input terminal of the touch control module;

an input terminal of the touching reset module is connected with the data signal terminal, and the control terminal of the touching reset module is connected with the reset signal terminal;

an control terminal of the touching control module is connected with the scanning signal terminal, and an output terminal of the touching control module is connected with the touch signal read terminal;

during the reset phase, under the control of the reset signal terminal, the touch reset module resets the touch sensing module; and during the touch read phase, under the control of the scanning signal terminal, the touch control module controls the touch sensing module to output a touch detection signal to the touch signal read terminal.

In one possible implementation, in the above-mentioned pixel circuit according to the embodiment of the present disclosure, the touch sensing module comprises: a third drive transistor and a touch sensing capacitor; wherein, a drain of the third drive transistor is connected with the input terminal of the touch control module; a source of the third drive transistor is connected with the touch signal input terminal; and a gate of the third drive transistor is connected with the output terminal of the touch reset module; and the touch sensing capacitor is connected between the gate and the source of the third drive transistor.

In one possible implementation, in the above-mentioned pixel circuit according to the embodiment of the present disclosure, the touch reset module comprises: a fourth switch transistor; wherein, a gate of the fourth switch transistor is connected with the reset signal terminal, a source of the fourth switch transistor is connected with the data signal terminal, and a drain of the fourth switch transistor is connected with the gate of the third drive transistor.

In one possible implementation, in the above-mentioned pixel circuit according to the embodiment of the present disclosure, the touch control module comprises: a fifth switch transistor; wherein, a gate of the fifth switch transistor is connected with the scanning signal terminal, a source of the fifth switch transistor is connected with the drain of the third drive transistor, and a drain of the fifth switch transistor is connected with the touch signal read terminal.

An organic electroluminescent display panel according to the embodiment of the present disclosure comprises the pixel circuit according to the embodiment of the present disclosure.

An display apparatus according to the embodiment of the present disclosure comprises the organic electroluminescent display panel according to the embodiment of the present disclosure.

DETAILED DESCRIPTION

Hereinafter, the detailed description of a pixel circuit, an organic electroluminescent display panel and a display apparatus according to embodiments of the present disclosure will be explained in detail with reference to the drawings.

Figure 1:
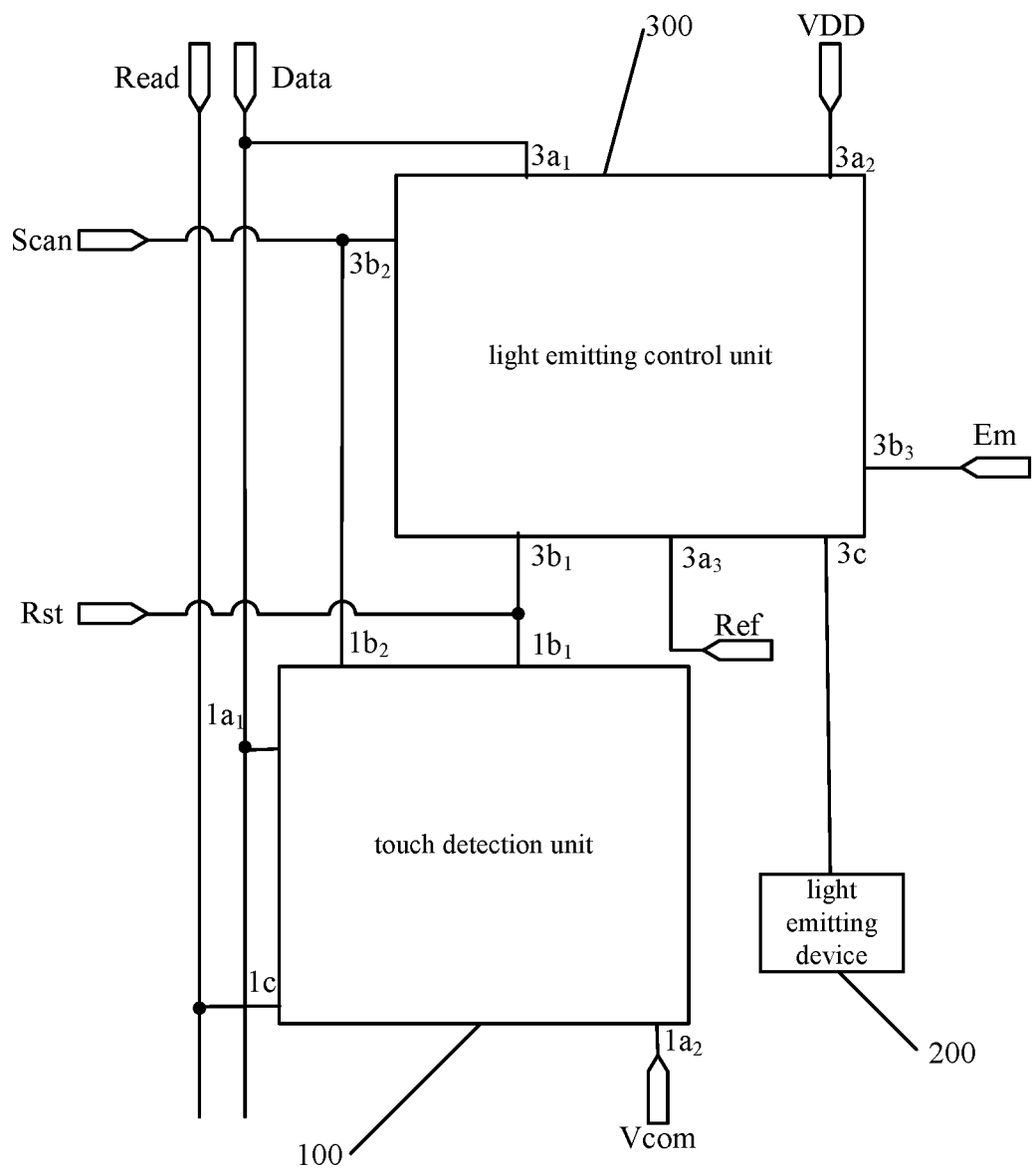
FIG. 1 is a structural representation of a pixel circuit according to an embodiment of the present disclosure.

As shown in FIG. 1, a pixel circuit according to an embodiment of the present disclosure comprises: a touch detection unit 100, a light emitting device 200 and a light emitting control unit 300.

In an example, a first input terminal $1a_1$ of the touch detection unit 100 is connected with a data signal terminal Data, a second input terminal $1a_2$ of the touch detection unit 100 is connected with a touch signal input terminal Vcom, a first control terminal $1b_1$ of the touch detection unit 100 is connected with a reset signal terminal Rst, a second control terminal $1b_2$ of the touch detection unit 100 is connected with a scanning signal terminal Scan, and an output terminal $1c$ of the touch detection unit 100 is connected with a touch signal read terminal Read.

In an example, a first input terminal $3a_1$ of the light emitting control unit 300 is connected with the data signal terminal Data, a second input terminal $3a_2$ of the light emitting control unit 300 is connected with a high level signal terminal VDD, a third input terminal $3a_3$ of the light emitting control unit 300 is connected with a reference signal terminal Ref, a first control terminal $3b_1$ of the light emitting control unit 300 is connected with the reset signal terminal Rst, a second control terminal $3b_2$ of the light emitting control unit 300 is connected with the scanning signal terminal Scan, a third control terminal $3b_3$ of the light emitting control unit 300 is connected with a light emitting signal terminal Em, and an output terminal $3c$ of the light emitting control unit 300 is connected with the light emitting device 200.

During a reset phase, under a control of the reset signal terminal Rst, the touch detection unit 100 and the light emitting control unit 300 are reset respectively; during a touch read phase, under a control of the scanning signal terminal Scan, the touch detection unit 100 outputs a touch detection signal to the touch signal read terminal Read, meanwhile the light emitting control unit 300 is charged; during a light emitting phase, under a control of the light emitting signal terminal Em, the light emitting control unit 300 drives the light emitting device 200 to emit light.

In the above-mentioned pixel circuit according to the embodiment of the present disclosure, during the reset phase, under the control of the reset signal terminal Rst, the touch detection unit 100 and the light emitting control unit 300 are reset respectively; during the touch read phase, under the control of the scanning signal terminal Scan, the touch detection unit 100 outputs the touch detection signal to the touch signal read terminal Read, so as to implement the touch detection function, meanwhile the light emitting control unit 300 is charged; and during the light emitting phase, under the control of the light emitting signal terminal Em, the light emitting control unit 300 drives the light emitting device 200 to emit light, so as to implement the display driving function. This pixel circuit integrates the functions of touch detection and displaying, thus the manufacturing cost of separately disposing the pixel circuit and the touch detection circuit may be saved, and the thickness of a display panel may also be reduced. And, in the above-mentioned pixel circuit according to the embodiment of the present disclosure, the touch detection unit 100 and the light emitting control unit 300 share the reset signal terminal Rst, the data signal terminal Data and the scanning signal terminal Scan, and thus the wiring for ports in the pixel circuit may also be saved.

Figure 2A:
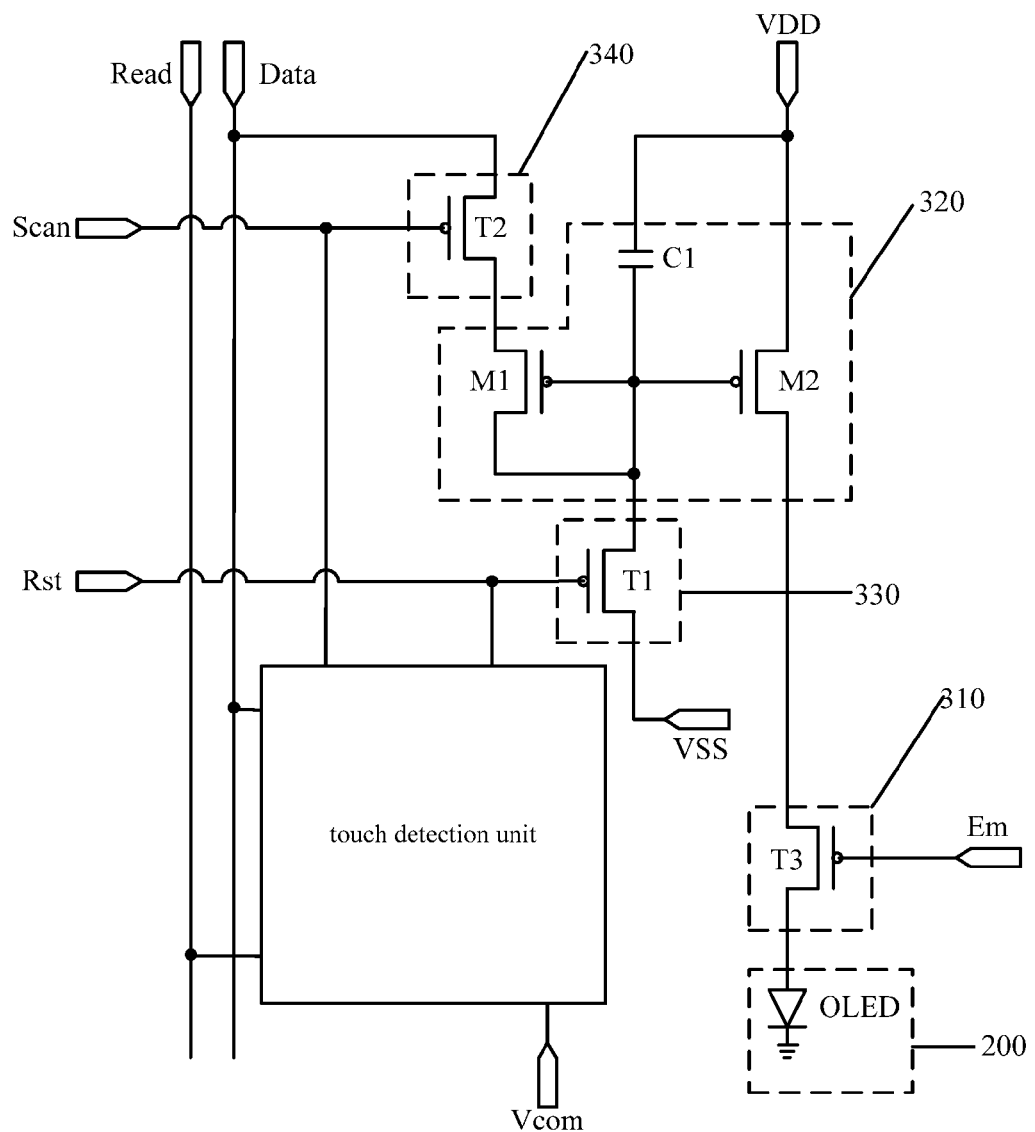
FIG. 2a and FIG. 2b are specific structural representations of a light emitting control unit in the pixel circuit according to an embodiment of the present disclosure respectively.
Figure 2B:
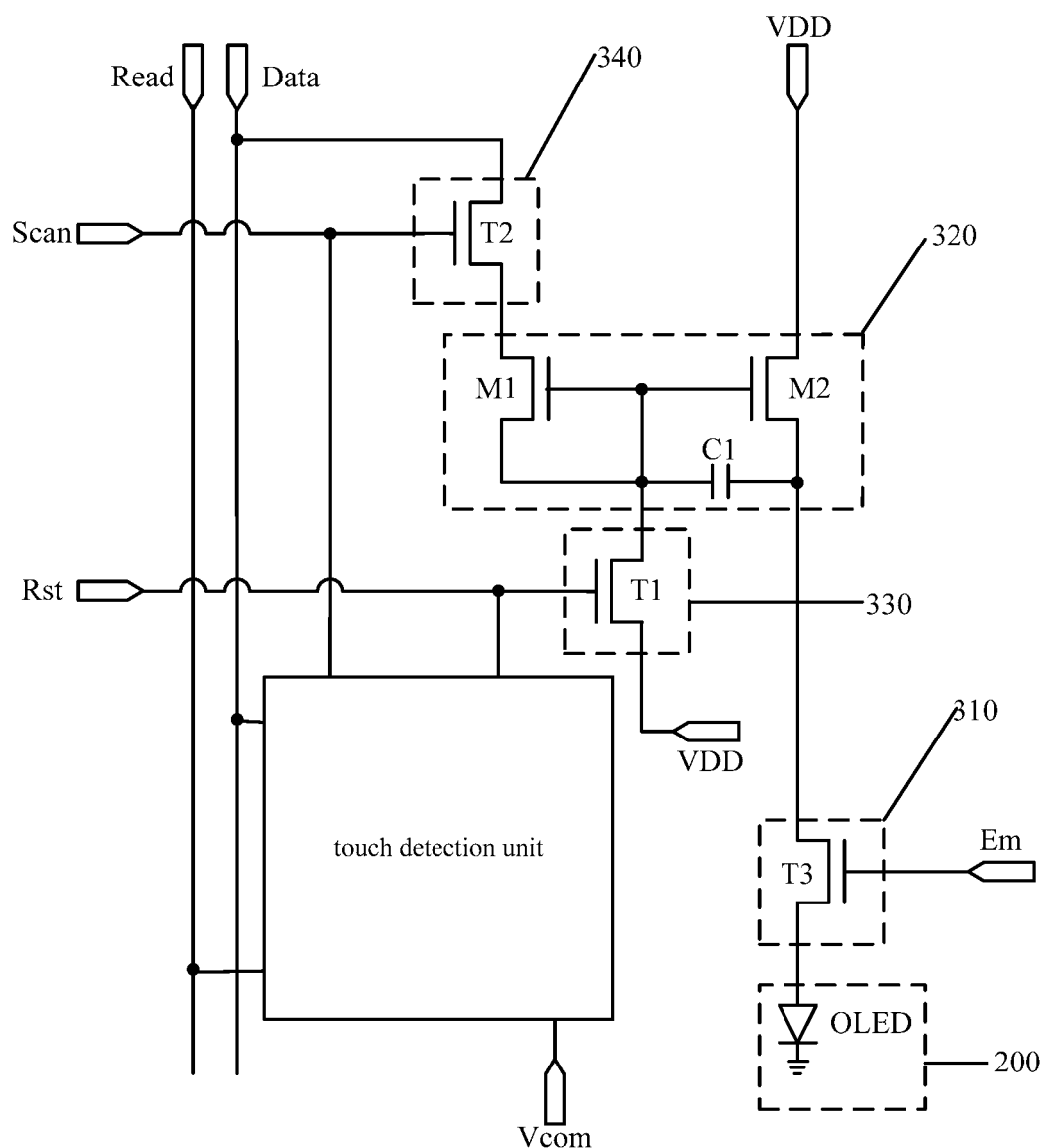
Figure 3:
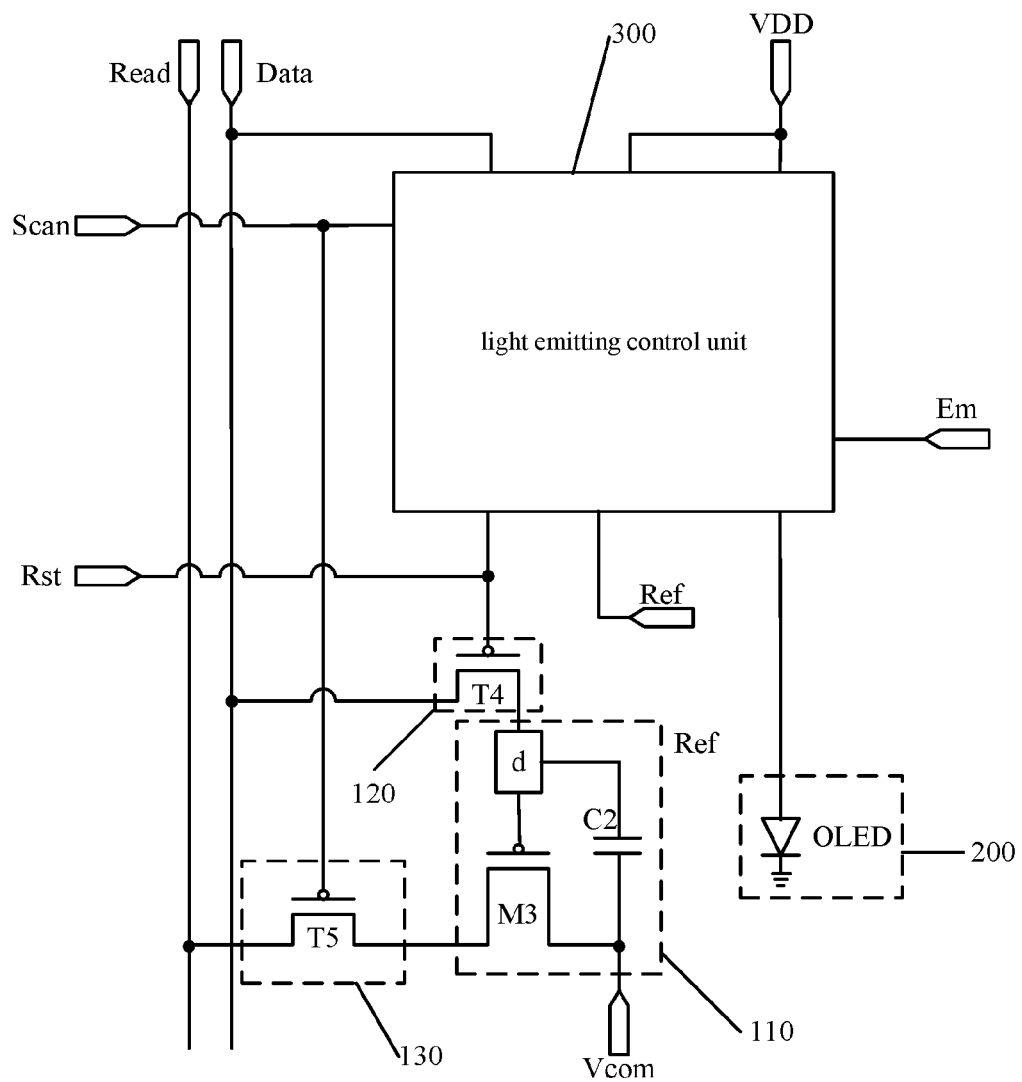
FIG. 3 is a specific structural representation of a touch detection unit in the pixel circuit according to an embodiment of the present disclosure.

As implemented in practice, as shown in FIGS. 2a, 2b and 3, generally an organic light emitting diode (OLED) is employed to implement the light emitting device 200 in the above-mentioned pixel circuit according to the embodiment of the present disclosure, wherein one terminal of the OLED is connected with the output terminal of the light emitting control unit 300, while the other terminal is grounded, and the OLED emits light so as to realize the displaying under an action of the drive current outputted from the light emitting control unit 300.

Hereinafter, the light emitting control unit 300 in the above-mentioned pixel circuit according to the embodiment of the present disclosure will be explained in detail.

Since the OLED needs to be driven by current, a steady current is required to control the light emitting, however, due to reasons such as processes and aging, there may be non-uniformity in threshold voltages $V_{th}$ of the drive transistors driving the OLEDs, which may cause the currents flowing through the OLEDs of respective pixel points to be varied and further cause uneven displaying brightness, and thus the displaying effect of an overall image may be affected. In order to avoid the foregoing problems, it is required to eliminate the affect of the threshold voltage $V_{th}$ of the drive transistor for driving the OLED from the drive current signal outputted from the output terminal 3c of the light emitting control unit 300.

Based on this, as shown in FIGS. 2a and 2b, the light emitting control unit 300 in the pixel circuit according to the embodiment of the present disclosure may specifically comprises: a light emitting control module 310, a light emitting driving module 320, a light emitting reset module 330 and a light emitting charging module 340.

In an example, an input terminal of the light emitting control unit 300, which functions as the third input terminal $3a_3$ of the light emitting control unit 300, is connected with the reference signal terminal Ref, a control terminal of the light emitting reset module 330, which functions as the first control terminal $3b_1$ of the light emitting control unit 300, is connected with the reset signal terminal Rst, and an output terminal of the light emitting reset module 330 is connected with the control terminal of the light emitting driving module 320.

An input terminal of the light emitting charging module 340, which functions as the input terminal $3a_1$ of the light emitting control unit 300, is connected with the data signal terminal Data, a control terminal of the light emitting charging module 340, which functions as the second control terminal $3b_2$ of the light emitting control unit 300, is connected with the scanning signal terminal Scan, and an output terminal of the light emitting charging module 340 is connected with the first input terminal of the light emitting driving module 320; a second input terminal of the light emitting driving module 320, which functions as the second input terminal $3a_2$ of the light emitting control unit 300, is connected with the high level signal terminal VDD.

An input terminal of the light emitting control module 310 is connected with the output terminal of the light emitting driving module 320, a control terminal of the light emitting control module 310, which functions as the third control terminal $3b_3$ of the light emitting control unit 300 is connected with the light emitting signal terminal Em, and an output terminal of the light emitting control module 310, which functions as the output terminal 3c of the light emitting control unit 300, is connected with the light emitting device 200.

During the reset phase, under the control of the reset signal terminal Rst, the light emitting reset module 330 resets the light emitting driving module 320; during the touch read phase, under the control of the scanning signal terminal Scan, the light emitting charging module 340 charges the light emitting driving module 320; and during the light emitting phase, under the control of the light emitting signal terminal Em, the light emitting control module 310 controls the light emitting driving module 320 to drive the light emitting device 200 to emit light.

As implemented in practice, as shown in FIGS. 2a and 2b, the light emitting driving module 320 in the above-mentioned pixel circuit according to the embodiment of the present disclosure specifically comprises: a first drive transistor M1 and a second drive transistor M2 which are set in mirror image, and a memory capacitor C1.

In an example, a source of the first drive transistor M1 is connected with the output terminal of the light emitting charging module 340.

In an example, a drain of the first drive transistor M1, a gate of the first drive transistor M1, a gate of the second drive transistor M2 are connected with the output terminal of the light emitting reset module 330 respectively.

A source of the second drive transistor M2 is connected with the high level signal terminal VDD, and a drain of the second drive transistor M2 is connected with the input terminal of the light emitting control module 310.

As shown in FIG. 2a, when both the first drive transistor M1 and the second drive transistor M2 are P type transistors, the reference signal terminal Ref is a low level signal terminal VSS, and a memory capacitor C1 is connected between the gate and the source of the second drive transistor M2.

As shown in FIG. 2b, when both the first drive transistor M1 and the second drive transistor M2 are N type transistors, the reference signal terminal Ref is the high level signal terminal VDD, and a memory capacitor C1 is connected between the gate and the drain of the second drive transistor M2.

Specifically, the drive transistors in the above-mentioned light emitting driving module 320 are the first drive transistor M1 and the second drive transistor M2 which are set in mirror image; and based on a principle of the mirror image circuit, threshold voltages $Vth_1$ and $Vth_2$ of the two drive transistors can be considered as being approximately equal to each other. And since both gates of the first drive transistor M1 and the second drive transistor M2 are connected with the output terminal of the light emitting reset module 330, the first drive transistor M1 and the second drive transistor M2 should be P type transistors or N type transistors at the same time. Since the threshold voltage of a P type transistor is a negative value, the voltage at the corresponding reference signal terminal Ref needs to be a negative voltage or a zero voltage, in order to ensure the first drive transistor M1 and the second drive transistor M2 to operate normally; as shown in FIG. 2a, an existing low level signal terminal VSS is generally employed to implement its function, however, embodiments of the present disclosure are not limited thereto, and other suitable signals may be used as the negative voltage or zero voltage. Since the threshold voltage of a N type transistor is a positive value, the voltage at the corresponding reference signal terminal Ref needs to be a positive voltage in order to ensure the first drive transistor M1 and the second drive transistor M2 to operate normally; as shown in FIG. 2b, an existing high level signal terminal VDD is generally employed to implement its function, however, embodiments of the present disclosure are not limited thereto, and other suitable signals may be used as the positive voltage.

Hereinafter, an operating principle of the light emitting control unit 300 in the above-mentioned pixel circuit according to the embodiment of the present disclosure will be explained briefly.

Particularly, the operation of the above-mentioned light emitting control unit 300 according to an embodiment of the present disclosure is divided into three phases A first phase is a reset phase, and during this phase, the light emitting control unit 300 implements a function for loading the reference voltage of the reference signal terminal Ref onto the control terminal, i.e., the gates of the first drive transistor M1 and the second drive transistor M2. During this phase, the scanning signal terminal Scan controls the light emitting charging module 340 to be in a turned-off state, the light emitting signal terminal Em controls the light emitting control module 310 to be in the turned-off state, and the reset signal terminal Rst controls the light emitting reset module 330 to be in a turned-on state; the light emitting reset module 330 which is in the turned-on state connects the reference signal terminal Ref with the gates of the first drive transistor M1 and the second drive transistor M2 respectively, so that the voltages at the gates of the first drive transistor M1 and the second drive transistor M2 are the reference voltage of the reference signal terminal Ref, and the first drive transistor M1 and the second drive transistor M2 are turned on. Particularly, when the first drive transistor M1 and the second drive transistor M2 are P type transistors, the corresponding reference voltage is the voltage Vss from the low level signal terminal VSS; and when the first drive transistor M1 and the second drive transistor M2 are N type transistors, the corresponding reference voltage is the voltage Vdd from the high level signal terminal VDD.

A second phase is a touch read phase, and during this phase, the light emitting control unit 300 implements a function for charging a data voltage Vdata of the data signal terminal Data into the control terminal of the light emitting driving module 320, i.e., the gates of the first drive transistor M1 and the second drive transistor M2, thereby a junming and compensating function is implemented. During this phase, the scanning signal terminal Scan controls the light emitting charging module 340 to be in the turned-on state, the light emitting signal terminal Em controls the light emitting control module 310 to be in the turned-off state, and the reset signal terminal Rst controls the light emitting reset module 330 to be in the turned-off state; the light emitting charging module 330 which is in the turned-on state connects the data signal terminal Data with the source of the first drive transistor M1, and since the drain and the gate of the first drive transistor M1 is short circuited, the gates of the first drive transistor M1 and the second drive transistor M2 can be recharged via the first drive transistor M1 until the voltage reaches Vdata−$Vth_1$, which realize the storing of the threshold voltage $Vth_1$ of the first drive transistor M1.

A third phase is a light emitting phase, and during this phase, the light emitting control unit 300 implements a function for driving the light emitting device 200 to emit light with a saturation current of the second drive transistor M2. During this phase, the scanning signal terminal Scan controls the light emitting charging module 340 to be in the turned-off state, the light emitting signal terminal Em controls the light emitting control module 310 to be in the turned-on state, and the reset signal terminal Rst controls the light emitting reset module 330 to be in the turned-off state; the light emitting control module 310 which is in the turned-on state connects the drain of the second drive transistor M2 with the light emitting device 200 to drive the light emitting device 200 to emit light, and the saturation current outputted from the drain of the second drive transistor M2 is $I_{OLED}=K(V_{GS}-Vth_2)^2=K[Vdd-(Vdata-Vth_1)-Vth_2]^2=K(Vdd-Vdata)^2$, wherein, K is a constant pertaining to the process, $V_{GS}$ is the gate-source voltage of the second drive transistor M2, and $Vth_2$ is the threshold voltage of the second drive transistor M2.

It can be seen that in the light emitting control unit 300 in the above-mentioned pixel circuit according to the embodiment of the present disclosure, the drive current used by the light emitting driving module 320 to drive the light emitting device 200 to emit light is only related to the data signal voltage inputted at the data signal terminal Data and the supply voltage Vdd, and is independent of the threshold voltage of the drive transistor for driving the light emitting device 200; thus the affect of the threshold voltage on the light emitting device 200 can be avoided, that is, when the identical data signals are loaded into the different pixel units, an image with identical brightness can be obtained, and thus the uniformity of the image brightness in the display area of the display apparatus is improved.

As implemented in practice, as shown in FIG. 2a and FIG. 2b, the light emitting reset module 330 in the above-mentioned pixel circuit according to the embodiment of the present disclosure specifically comprises: a first switch transistor T1.

In an example, a source of the first switch transistor T1 is connected with the reference signal terminal Ref, a gate of the first switch transistor T1 is connected with the reset signal terminal Rst, and a drain of the first switch transistor T1 is the output terminal of the light emitting reset module 330.

As implemented in particular, the first switch transistor T1 may be a N type transistor or a P type transistor, and there is no limitation on it. When the first switch transistor T1 is the N type transistor and the signal at the reset signal terminal Rst is in the high level, as shown in FIG. 2b, the first switch transistor T1 is in the turned-on state; and when the first switch transistor T1 is the P type transistor and the signal at the reset signal terminal Rst is in the low level, as shown in FIG. 2a, the first switch transistor T1 is in the turned-on state.

When the light emitting reset module 330 in the pixel circuit according to the embodiment of the present disclosure specifically takes the above-mentioned first switch transistor T1 as a specific structure, an operating principle thereof is as follows: during the reset phase, under the control of the reset signal terminal Rst, the first switch transistor T1 is in the turned-on state, the reference signal terminal Ref charges the gates of the first drive transistor M1 and the second drive transistor M2, and the first drive transistor M1 and the second drive transistor M2 are turned on; in the touch read phase and the light emitting phase, under the control of the reset signal terminal Rst, the first switch transistor T1 is in the turned-off state.

As implemented in practice, as shown in FIG. 2a and FIG. 2b, the light emitting charging module 340 in the above-mentioned pixel circuit according to the embodiment of the present disclosure specifically comprises: a second switch transistor T2.

In an example, a source of the second switch transistor T2 is connected with the data signal terminal Data, a gate of the second switch transistor T2 is connected with the scanning signal terminal Scan, and a drain of the second switch transistor T2 is connected with the source of the first drive transistor M1.

As implemented in particular, the second switch transistor T2 may be a N type transistor or a P type transistor, and there is no limitation on it. When the second switch transistor T2 is a N type transistor and the signal at the scanning signal terminal Scan is in the high level, as shown in FIG. 2b, the second switch transistor T2 is in the turned-on state; and when the second switch transistor T2 is the P type transistor and the signal at the scanning signal terminal Scan is in the low level, as shown in FIG. 2a, the second switch transistor T2 is in the turned-on state.

When the light emitting charging module 340 in the pixel circuit according to the embodiment of the present disclosure specifically takes the above-mentioned second switch transistor T2 as a specific structure, a operating principle thereof is as follows: in the touch read phase, under the control of the scanning signal terminal Scan, the second switch transistor T2 is in the turned-on state, and connects the data signal terminal Data with the source of the first drive transistor M1, and since the drain and the gate of the first drive transistor M1 is short circuited, the gates of the first drive transistor M1 and the second drive transistor M2 can be recharged via the first drive transistor M1 until the voltage reaches Vdata−Vth$_1$; in the reset phase and the light emitting phase, under the control of the scanning signal terminal Scan, the second switch transistor T2 is in the turned-off state.

As implemented in practice, as shown in FIG. 2a and FIG. 2b, the light emitting control module 310 in the above-mentioned pixel circuit according to the embodiment of the present disclosure specifically comprises: a third switch transistor T3.

In an example, a gate of the third switch transistor T3 is connected with the light emitting signal terminal Em, a source of third switch transistor T3 is connected with the drain of the second drive transistor, and a drain of the third switch transistor T3 is connected with the light emitting device 200.

As implemented in particular, the third switch transistor T3 may be a N type transistor or a P type transistor, and there is no limitation on it. When the third switch transistor T3 is the N type transistor and the signal at the light emitting signal terminal Em is in the high level, as shown in FIG. 2b, the third switch transistor T3 is in the turned-on state; and when the third switch transistor T3 is the P type transistor and the signal at the light emitting signal terminal Em is in the low level, as shown in FIG. 2a, the third switch transistor T3 is in the turned-on state.

When the light emitting control module 310 in the pixel circuit according to the embodiment of the present disclosure specifically takes the above-mentioned third switch transistor T3 as a specific structure, an operating principle thereof is as follows: in the light emitting phase, under the control of the light emitting signal terminal Em, the third switch transistor T3 is in the turned-on state, and connects the drain of the second drive transistor M2 with the light emitting device 200 to drive the light emitting device 200 to emit light; in the reset phase and the touch read phase, under the control of the light emitting signal terminal Em, the third switch transistor T3 is in the turned-off state.

Hereinafter, the touch detection unit 100 in the above-mentioned pixel circuit according to the embodiment of the present disclosure will be explained in detail.

As shown in FIG. 3, the touch detection unit 100 in the pixel circuit according to the embodiment of the present disclosure may specifically comprises: a touch sensing module 110, a touch reset module 120 and a touch control module 130.

In an example, an input terminal of the touch sensing module 110, which functions as the second input terminal 1a$_2$ of the touch detection unit 100, is connected with the touch signal input terminal Vcom, a control terminal of the touch sensing module 110 is connected with an output terminal of the touch reset module 120, and an output terminal of the touch sensing module 110 is connected with an input terminal of the touch control module 130.

In an example, an input terminal of the touch reset module 120, which functions as the first input terminal 1a$_1$ of the touch detection unit, is connected with the data signal terminal Data, an a control terminal of the touch reset module 120, which functions as the first control terminal 1b$_1$ of the touch detection unit 100, is connected with the reset signal terminal Rst.

In an example, a control terminal of the touch control module 130, which functions as the second control terminal 1b$_2$ of touch detection unit 100, is connected with the scanning signal terminal Scan; and an output terminal of the touch control module 130, which functions as the output terminal 1c of the touch detection unit 100, is connected with the touch signal read terminal Read.

During the reset phase, under the control of the reset signal terminal Rst, the touch reset module 120 resets the touch sensing module 110; and during the touch read phase, under the control of the scanning signal terminal Scan, the touch control module 130 controls the touch sensing module 110 to output the touch detection signal to the touch signal read terminal Read.

As implemented in practice, as shown in FIG. 3, the touch sensing module 110 in the above-mentioned pixel circuit according to the embodiment of the present disclosure specifically comprises: a third drive transistor M3 and a touch sensing capacitor C2.

In an example, a drain of the third drive transistor M3 is connected with the input terminal of the touch control module 130, a source of the third drive transistor M3 is connected with the touch signal input terminal Vcom, and a gate of the third drive transistor M3 is connected with the output terminal of the touch reset module 120.

In an example, the touch sensing capacitor C2 is connected between the gate and the source of the third drive transistor M3.

Figure 4A:
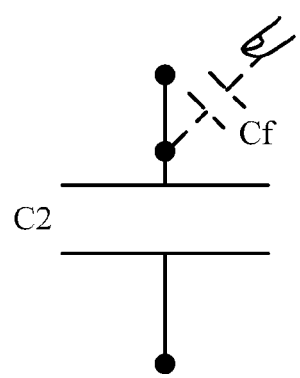
FIG. 4a and FIG. 4b are exemplary views illustrating detection principles of a touch detection in the pixel circuit unit according to an embodiment of the present disclosure respectively.
Figure 4B:
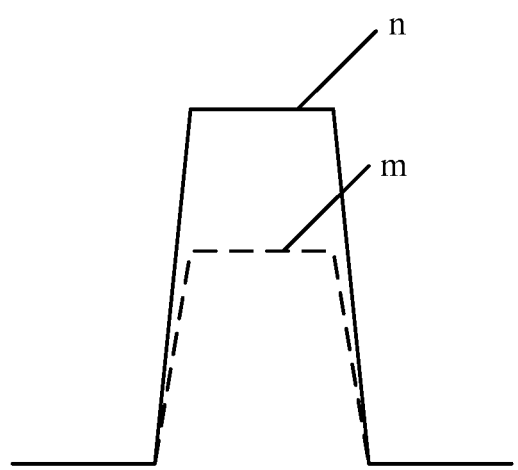

As implemented in practice, an upper plate of the touch sensing capacitor C2 in the touch sensing module 110 as described above functions as a probe electrode d, and when a finger touches the probe electrode d, as shown in FIG. 4a, a capacitance value of the sensing capacitor C2 becomes smaller because a body capacitance Cf is applied on the touch sensing capacitor C2. As shown in FIG. 4, a potential of the touch sensing capacitor C2 as being touched by the finger is m, and the potential of the touch sensing capacitor C2 without being touched by the finger is n, while a potential at the gate of the third drive transistor M3 varies as the capacitance value of the sensing capacitor C2 varies. When the third drive transistor M3 operates in an amplification region and acts as an amplifying transistor, it amplifies and outputs the touch input signal from the touch signal input terminal Vcom based on the voltage of the probe electrode d correspondingly to the input terminal of the touch control module 130. xy coordinates of the position touched by the finger is determined by taking a direction in which the scanning signal terminal Scan is connected with the touch control module 130 as a x-direction and taking a direction in which the touch read terminal Read is connected with the touch control module 130 as a y-direction, thus the touch position is located.

Particularly, the third drive transistor M3 in the above-mentioned touch sensing module 110 may be a P type transistor or a N type transistor. Since the threshold voltage of the P type transistor is a negative value, when the P type transistor is employed as the third drive transistor M3, the gate of the third drive transistor M3 may be set to the high potential during an initial phase, i.e., not being touched by the finger, and that is to say, when the third drive transistor M3 is not touched by the finger, the third drive transistor M3 is in the turned-off state, and therefore the touch read terminal Read which is connected with the drain of the third drive transistor M3 via the touch control module 130 obtains a touch detection signal which is in the low potential accordingly during the touch read phase; the gate of the third drive transistor M3 is in the low potential as being touched by the finger, i.e., the finger touching occurs, the third drive transistor M3 is in the turned-on state and operates in the amplification region, and the touch input signal of the touch signal terminal Vcom is amplified and outputted, and therefore the touch read terminal Read which is connected with the drain of the third drive transistor M3 via the touch control module 130 obtains a touch detection signal which is in the high potential accordingly during the touch read phase, and it can determine whether the touching occurs by comparing the values of the touch detection signal before and after the change.

In contrast, since the threshold voltage of the N type transistor is a positive value, when the N type transistor is employed as the third drive transistor M3, the gate of the third drive transistor M3 may be set to the high potential during the initial phase, i.e., not being touched by the finger, and that is to say, when the third drive transistor M3 is not touched by the finger, it is in the turned-on state and operates in the amplification region, and the touch input signal of the touch signal terminal Vcom is amplified and outputted, therefore the touch read terminal Read which is connected with the drain of the third drive transistor M3 via the touch control module 130 obtains a touch detection signal which is in the high potential accordingly during the touch read phase; the gate of the third drive transistor M3 is in the low potential as being touched by the finger, i.e., the finger touching occurs, the third drive transistor M3 is in the turned-off state, and therefore the touch read terminal Read which is connected with the drain of the third drive transistor M3 via the touch control module 130 obtains a touch detection signal which is in the low potential accordingly during the touch read phase, and it can determine whether the touching occurs by comparing the values of the touch detection signal before and after the change.

It can be seen that when the P type transistor is selected as the third drive transistor M3, the touch detection signal outputted from the touch read terminal Read is in the high potential when the finger touching occurs, and the touch detection signal outputted from the touch read terminal Read is in the low potential when no finger touches; in contrast to the case where the P type transistor is selected as the third drive transistor M3, when the N type transistor is selected as the third drive transistor M3, the touch detection signal outputted from the touch read terminal Read is in the low potential when the finger touching occurs, and the touch detection signal outputted from the touch read terminal Read is in the high potential when no finger touches.

Hereinafter, the operating principle of the touch detection unit 100 in the above-mentioned pixel circuit according to the embodiment of the present disclosure will be explained briefly.

Particularly, the operation of the above-mentioned touch detection unit 100 according to the embodiment of the present disclosure is divided into two phases.

A first phase is a reset phase, and during this phase, the touch detection unit 100 implements a function for loading the data signal voltage of the data signal terminal Data onto the control terminal of the touch sensing module 110, i.e., the gate of the third drive transistor M3. During this phase, the scanning signal terminal Scan controls the touch control module 130 to be in the turned-off state, and the reset signal terminal Rst controls the touch reset module 120 to be in the turned-on state; the touch reset module 120 which is in the turned-on state connects the data signal terminal Data with the gate of the third drive transistor M3, so that the voltages at the gate of the third drive transistor M1 and the probe electrode d of the touch sensing capacitor C2 are equal to the data signal voltage of the data signal terminal Data. Particularly, when the third drive transistor M3 is the P type transistor and the data signal voltage is in the high potential, the third drive transistor M3 is in the turned-off state at this point; and when the third drive transistor M3 is the N type transistor and the data signal voltage is in the high potential, the third drive transistor M3 is in the turned-on state at this point;

A second phase is a touch read phase, and during this phase, the touch detection unit 100 implements a function for outputting the touch detection signal to the touch read terminal Read. During this phase, the scanning signal terminal Scan controls the touch control module 130 to be in the turned-on state, and the reset signal terminal Rst controls the touch reset module 120 to be in the turned-off state; the touch control module 130 which is in the turned-on state connects the touch read terminal Read with the drain of the third drive transistor M3, and at this point, when the finger touching occurs, the potential at the gate of the third drive transistor M3 will drop; and if the third drive transistor M3 is the P type transistor, at this point the third drive transistor switches from the turned-off state to the turned-on state, and operates in the amplification region, and the touch input signal of the touch signal input terminal Vcom is amplified accordingly and outputted to the touch read terminal Read; that is, if the finger touching occurs, the touch read terminal Read would receive a high potential signal, and if there is no finger touching, the touch read terminal Read would receive a low potential signal; and when the third drive transistor M3 is the N type transistor, at this point the third drive transistor switches from the turned-on state to the turned-off state; that is, if the finger touching occurs, the touch read terminal Read would receive the low potential signal, and if there is no finger touching, the touch read terminal Read would receive the high potential signal.

It can be seen that the first phase in the operation of the touch detection unit 100 and the first phase and the third phase of the light emitting control unit 300 can be combined, and the second phase in the operation of the touch detection unit 100 and the second phase of the light emitting control unit 300 can be combined, therefore, the pixel circuit according to the embodiment of the present disclosure has three operating phases in total.

As implemented in practice, as shown in FIG. 3, the touch reset module 120 in the above-mentioned pixel circuit according to the embodiment of the present disclosure specifically comprises: a fourth switch transistor T4.

In an example, a gate of the fourth switch transistor T4 is connected with the reset signal terminal Rst, a source of the fourth switch transistor T4 is connected with the data signal terminal Data, and a drain of the fourth switch transistor T4 is connected with the gate of the third drive transistor M3.

As implemented in particular, the fourth switch transistor T4 may be the N type transistor or the P type transistor, and there is no limitation on it. When the fourth switch transistor T4 is the N type transistor and the signal of the reset signal terminal Rst is in the high level, the fourth switch transistor T4 is in the turned-on state; and when the fourth switch transistor T4 is the P type transistor and the signal of the reset signal terminal Rst is in the low level, the fourth switch transistor T4 is in the turned-on state. It is should be noted that since the gates of the fourth switch transistor T4 and the first switch transistor T1 should share the same reset signal terminal Rst, both of the fourth switch transistor T4 and the first switch transistor T1 should be P type transistors or N type transistor at the same time in order to make they two to be turned on or turned off simultaneously.

When the touch reset module 120 in the pixel circuit according to the embodiment of the present disclosure specifically takes the above-mentioned fourth switch transistor T4 as a specific structure, an operating principle thereof is as follows: during the reset phase, under the control of the reset signal terminal Rst, the fourth switch transistor T4 is in the turned-on state, the data signal terminal Data charges the gate of the third drive transistor M3, and the third drive transistor M3 is turned on when the third drive transistor M3 is the P type transistor while the third drive transistor M3 is turned off when the third drive transistor M3 is the N type transistor; in the touch read phase, under the control of the reset signal terminal Rst, the fourth switch transistor T4 is in the turned-off state.

As implemented in practice, as shown in FIG. 3, the touch control module 130 in the above-mentioned pixel circuit according to the embodiment of the present disclosure may specifically comprise: a fifth switch transistor T5.

In an example, a gate of the fifth switch transistor T5 is connected with the scanning signal terminal Scan, a source of the fifth switch transistor T5 is connected with the drain of the third drive transistor M3, and a drain of the fifth switch transistor T5 is connected with the touch signal read terminal Read.

As implemented in particular, the fifth switch transistor T5 may be the N type transistor or the P type transistor, and there is no limitation on it. When the fifth switch transistor T5 is the N type transistor and the signal of the scanning signal terminal Scan is in the high level, the fifth switch transistor T5 is in the turned-on state; and when the fifth switch transistor T5 is the P type transistor and the signal of the scanning signal terminal Scan is in the low level, the fifth switch transistor T5 is in the turned-on state. It is should be noted that since the gates of the fifth switch transistor T5 and the second switch transistor T2 should share the same scanning signal terminal Scan, both of the fifth switch transistor T5 and the second switch transistor T2 should be the P type transistors or N type transistor at the same time in order to make they two to be turned on or turned off simultaneously.

When the touch control module 130 in the pixel circuit according to the embodiment of the present disclosure specifically takes the above-mentioned fifth switch transistor T5 as a specific structure, an operating principle thereof is as follows: in the touch read phase, under the control of the scanning signal terminal Scan, the fifth switch transistor T5 is in the turned-on state, and connects the touch read terminal Read with the drain of the third drive transistor M3, and outputs the touch detection signal of the third drive transistor M3; and in the reset phase, under the control of the scanning signal terminal Scan, the fifth switch transistor T5 is in the turned-off state.

It should be noted that the drive transistors and the switch transistors mentioned in the above-described embodiments may be thin film transistors (TFTs), and may also be metal oxide semiconductor field effect tubes (MOSs), and there is no limitation on it. In a specific implementation, the sources and the drains of these transistors can be exchangeable without being distinguished from each other. Various specific embodiments are explained by taking a case where all the drive transistors and the switch transistors are the film transistors as an example.

And, the drive transistors and the switch transistors mentioned in the above-mentioned pixel circuit according to the embodiment of the present disclosure may be designed as being all P type transistors or all N type transistors, thus the manufacturing process of the pixel circuit may be simplified.

Figure 5:
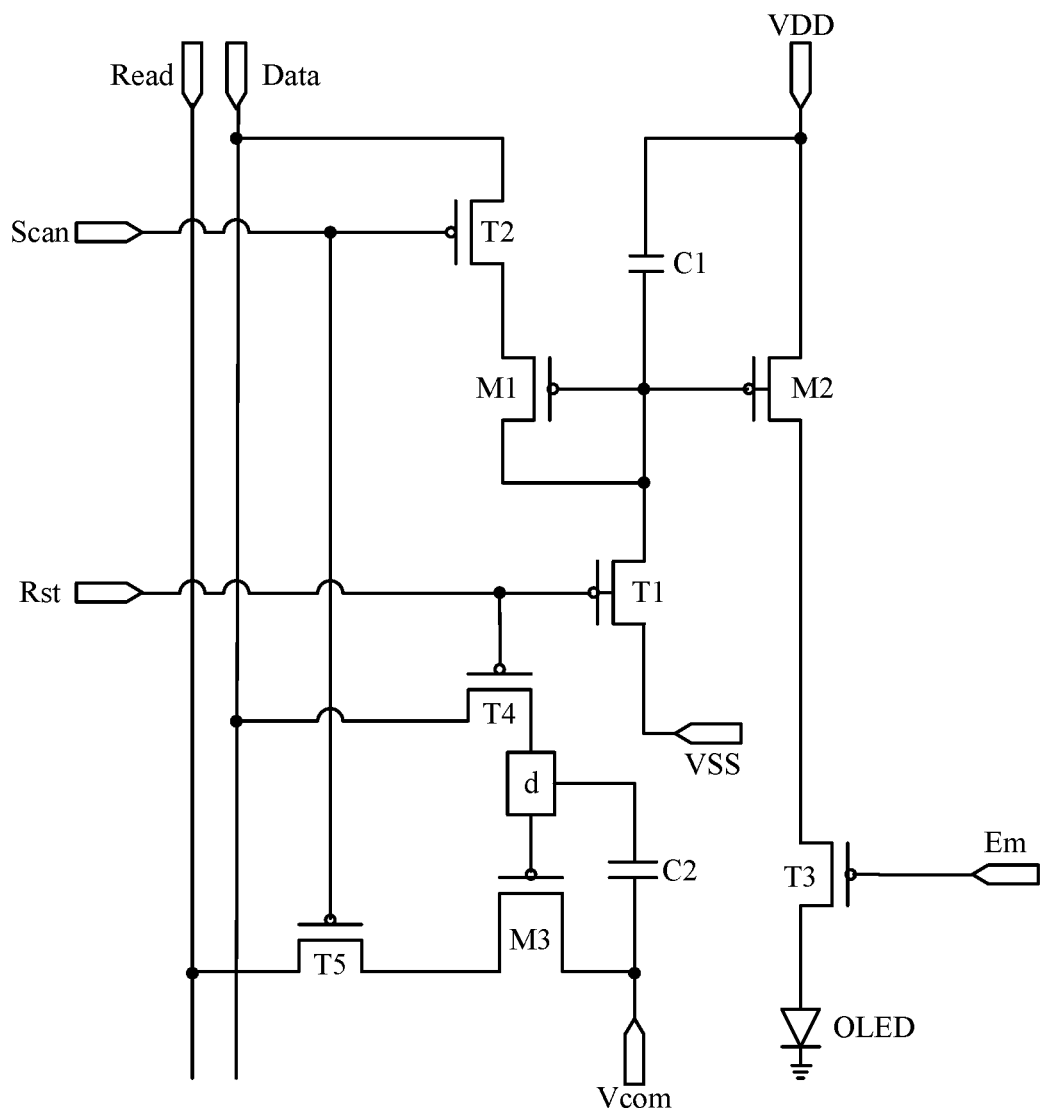
FIG. 5 is a specific structural representation of a first example according to an embodiment of the present disclosure.
Figure 6:
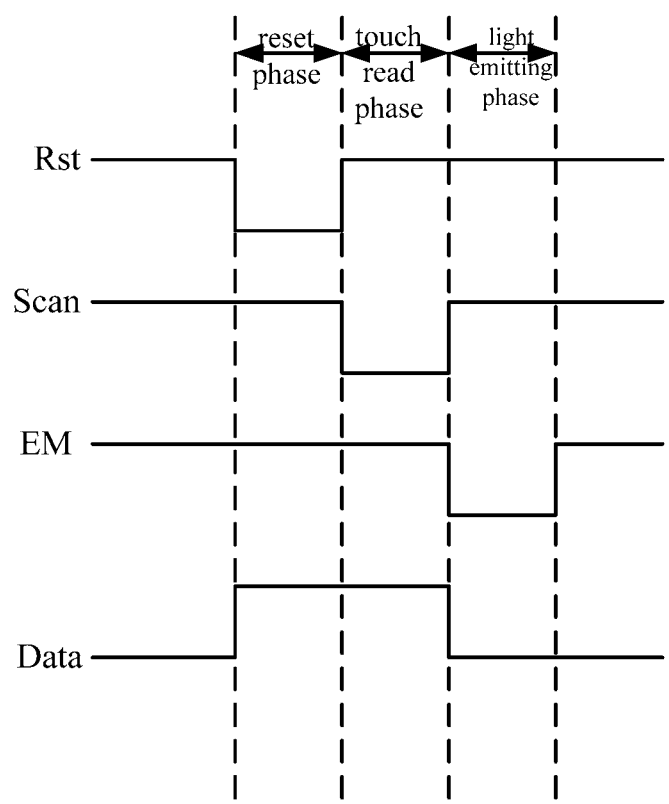
FIG. 6 is a circuit timing diagram of the first example according to an embodiment of the present disclosure.

Hereinafter, an operating principle of the pixel circuit will be explained by taking a case where all of the drive transistors and switch transistors in the above-mentioned pixel circuit are the P type transistors as a first example. FIG. 5 is a specific circuit representation of the pixel circuit, and FIG. 6 is the corresponding circuit timing diagram.

Figure 7:
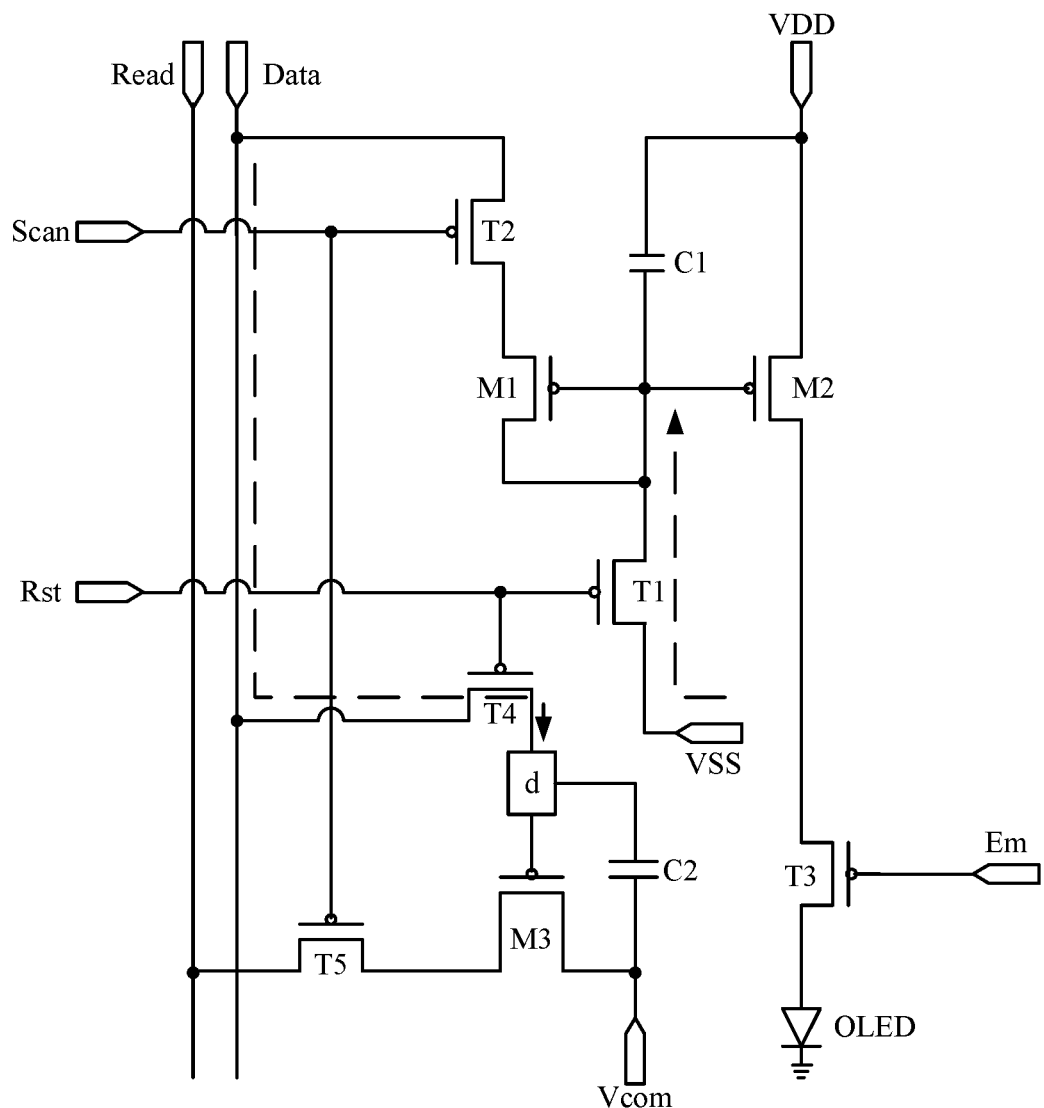
FIG. 7 is a schematic diagram of the first example during a reset phase according to an embodiment of the present disclosure.

A first phase is a reset phase, and as shown in FIG. 7, during this phase, the touch detection unit 100 implements a function for loading the reference voltage of the reference signal terminal Ref onto the gates of the first transistor M1 and the second drive transistor M2, and implements a function for loading the data signal voltage of the data signal terminal Data onto the gate of the third drive transistor M3.

During this phase, the scanning signal terminal Scan inputs the high level signal, and controls the second switch transistor T2 and the fifth switch transistor T5 to be in the turned-off state; the light emitting signal terminal Em inputs a high level signal, and controls the third switch transistor T3 to be in the turned-off state; the reset signal terminal Rst inputs the low level signal, and controls the first switch transistor T1 and the fourth switch transistor T4 to be in the turned-on state, and the data signal terminal Data inputs the high level signal, and the reference signal terminal Ref is the low level signal terminal VSS.

The first switch transistor T1 which is turned on connects the low level signal terminal VSS with the gates of the first drive transistor M1 and the second drive transistor M2 respectively, so that the gate voltages of the first drive transistor M1 and the second drive transistor M2 are in the low potential, and the first drive transistor M1 and the second drive transistor M2 are turned on.

The fourth switch transistor T4 which is turned on connects the data signal terminal Data with the gate of the third drive transistor M3, so that the voltages at the gate of the third drive transistor M1 and the probe electrode d of the touch sensing capacitor C2 are in the high potential, and the third drive transistor M3 is in the turned-off state.

Figure 8:
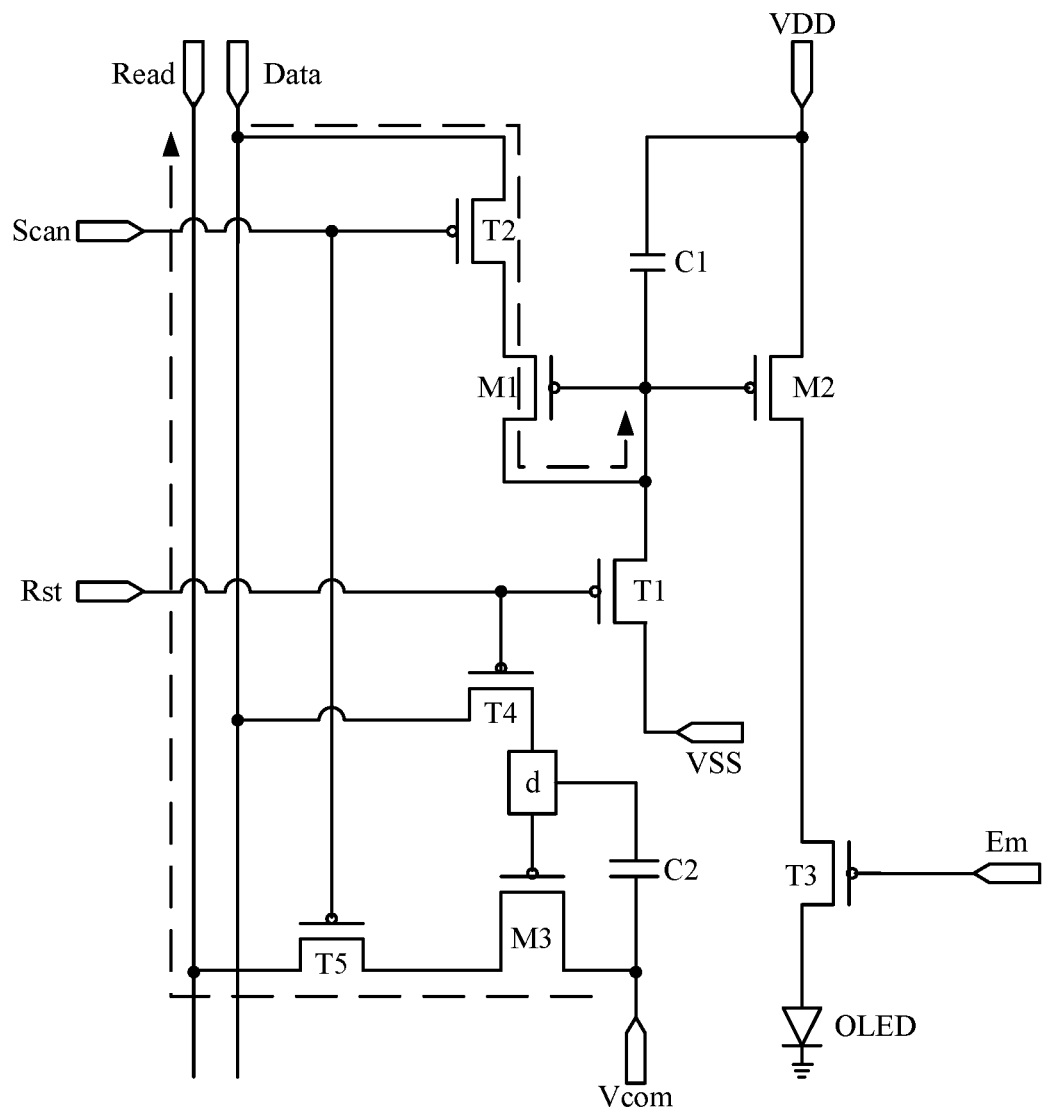
FIG. 8 is a schematic diagram of the first example during a touch read phase according to an embodiment of the present disclosure.

A second phase is a touch read phase, and as shown in FIG. 8, during this phase, the light emitting control unit 300 implements the function for charging the data voltage Vdata of the data signal terminal Data into the gates of the first drive transistor M1 and the second drive transistor M2 so as to implement the junming and compensating, and implements the function of outputting the touch detection signal at the touch read terminal Read.

During this phase, the scanning signal terminal Scan inputs the low level signal, and controls the second switch transistor T2 and the fifth switch transistor T5 to be in the turned-on state; the light emitting signal terminal Em inputs the high level signal, and the third switch transistor T3 is in the turned-off state; the reset signal terminal Rst inputs the high level signal, and controls the first switch transistor T1 and the fourth switch transistor T4 to be in the turned-off state, and the data signal terminal Data inputs the high level signal, and the reference signal terminal Ref is the low level signal terminal VSS.

The second switch transistor T2 which is turned on connects the data signal terminal Data with the source of the first drive transistor M1, and since the drain and the gate of the first drive transistor M1 is short circuited, the gates of the first drive transistor M1 and the second drive transistor M2 can be recharged via the first drive transistor M1 until the voltage reaches Vdata−$Vth_1$, which realizes the storing of the threshold voltage $Vth_1$ of the first drive transistor M1.

The fifth switch transistor T5 which is turned on connects the touch read terminal Read to the drain of the third drive transistor M3, and at this point, if the finger touching occurs, the potential at the gate of the third drive transistor M3 would drop; and in turn the third drive transistor switches from the turned-off state to the turned-on state, and operates in the amplification region, and the touch input signal of the touch signal input terminal Vcom is amplified accordingly and outputted to the touch read terminal Read; that is, if the finger touching occurs, the touch read terminal Read receives the high potential signal, and if there is no finger touching, the touch read terminal Read receives the low potential signal.

Figure 9:
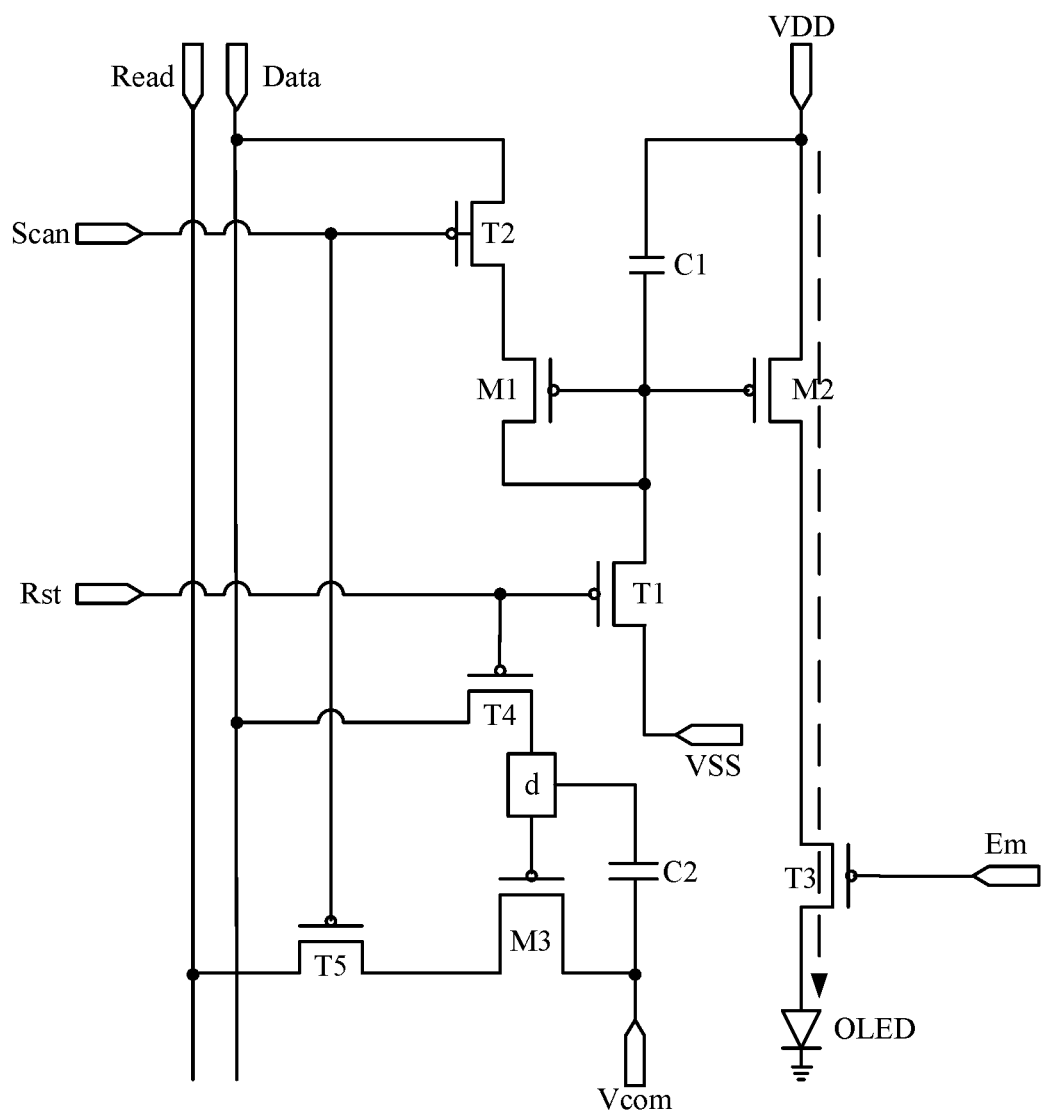
FIG. 9 is a schematic diagram of the first example a light emitting phase according to an embodiment of the present disclosure during.

A third phase is a light emitting phase, and as shown in FIG. 9, during this phase, the light emitting control unit 300 implements the function for driving the OLED to emit light with the saturation current of the second drive transistor M2, and the touch detection unit 100 is in a suspension phase, thus the light emitting of the OLED is affected minimally.

During this phase, the scanning signal terminal Scan inputs the high level signal, and controls the second switch transistor T2 and the fifth switch transistor T5 to be in the turned-off state; the light emitting signal terminal Em inputs the low level signal, and the third switch transistor T3 is in the turned-on state; the reset signal terminal Rst inputs the high level signal, and controls the first switch transistor T1 and the fourth switch transistor T4 to be in the turned-off state, and the data signal terminal Data inputs the low level signal, and the reference signal terminal Ref is the low level signal terminal VSS.

The third switch transistor T3 which is turned on connects the drain of the second drive transistor M2 with the OLED to drive the OLED to emit light, and the saturation current outputted from the drain of the second drive transistor M2 is $I_{OLED}=K(V_{GS}-Vth_2)^2=K[Vdd-(Vdata-Vth_1)-Vth_2]^2=K(Vdd-Vdata)^2$, wherein, K is a constant pertaining to the process, $V_{GS}$ is the gate-source voltage of the second drive transistor M2, and $Vth_2$ is the threshold voltage of the second drive transistor M2. It can be seen that the drive current for driving the OLED to emit light by the second drive transistor M2 is only related to the data signal voltage Vdata inputted at the data signal terminal Data and the supply voltage Vdd, and is independent of the threshold voltages $Vth_1$ and $Vth_2$ of the first drive transistor M1 and the second drive transistor M2; thus the affect of the threshold voltages on the OLED can be avoided, that is, when the identical data signals are loaded into the different pixel units, image with identical brightness is obtained, and thus the uniformity of the image brightness in the display area of the display apparatus is improved.

Figure 10:
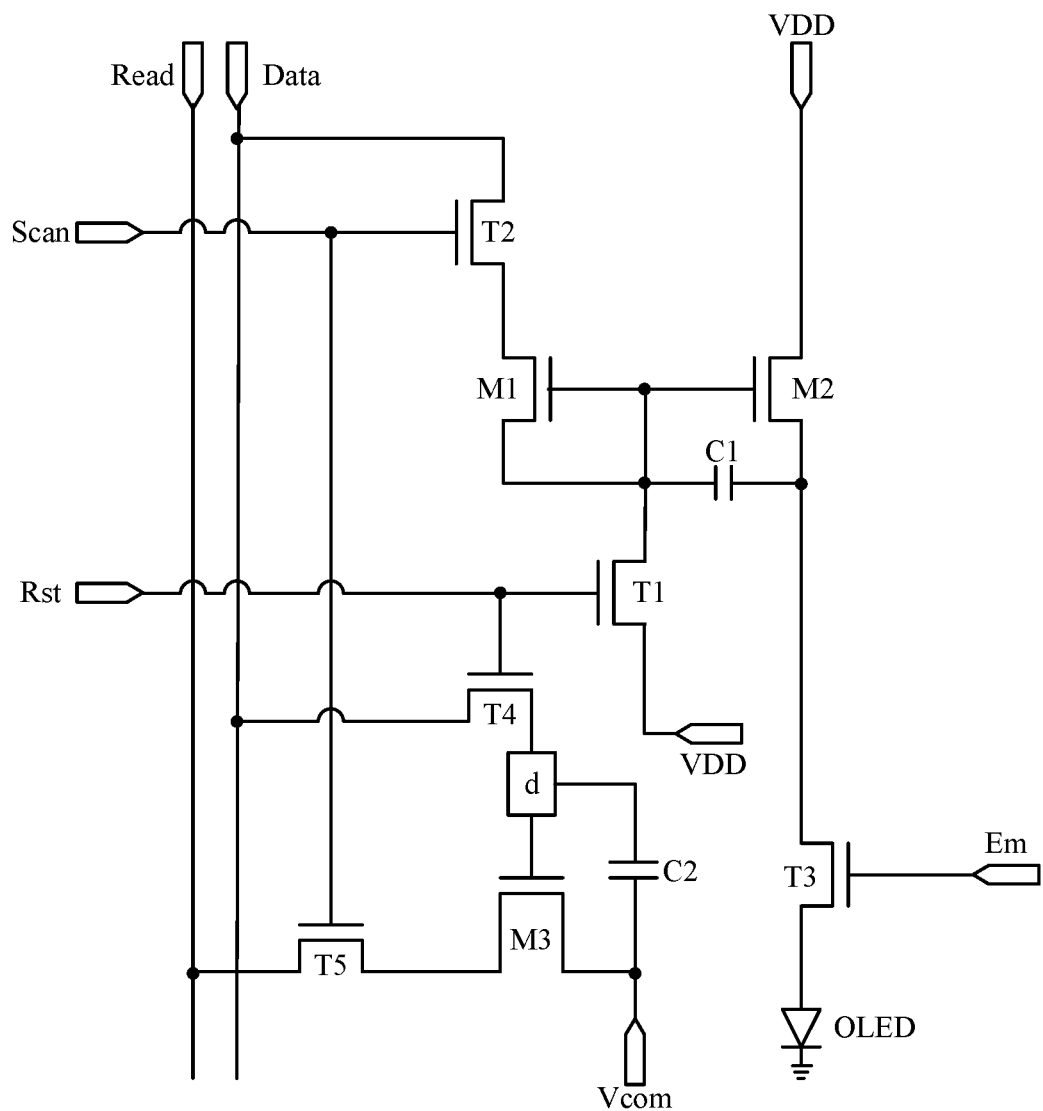
FIG. 10 is a specific structural representation of a second example according to an embodiment of the present disclosure.
Figure 11:
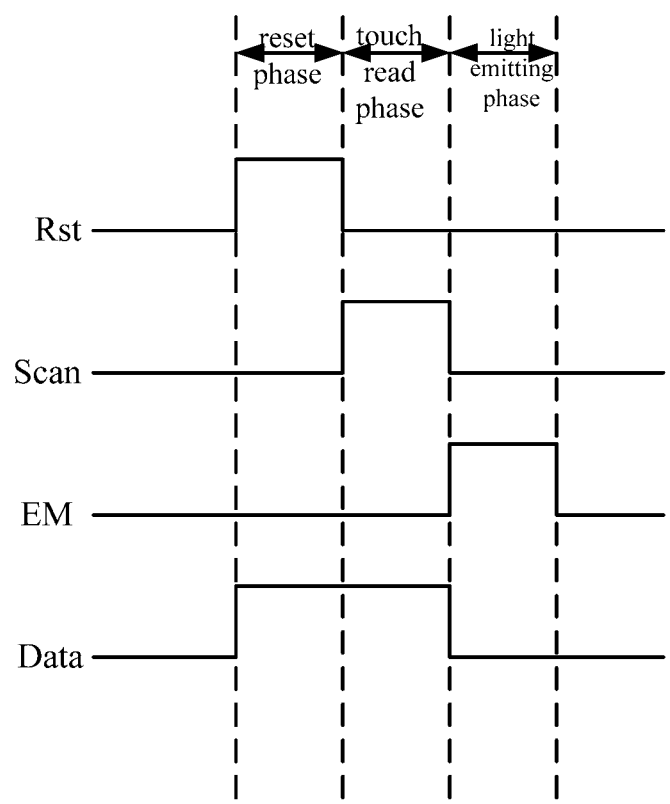
FIG. 11 is a circuit timing diagram of the second example according to an embodiment of the present disclosure.

Hereinafter, the operating principle of the pixel circuit will be explained by taking a case where all of the drive transistors and switch transistors in the above-mentioned pixel circuit are N type transistors as a second example. FIG. 10 is a specific circuit representation of the pixel circuit, and FIG. 11 is the corresponding circuit timing diagram.

A first phase is a reset phase, and during this phase, the touch detection unit 100 implements the function for loading the reference voltage of the reference signal terminal Ref onto the gates of the first transistor M1 and the second drive transistor M2, and implements the function for loading the data signal voltage of the data signal terminal Data onto the gate of the third drive transistor M3.

During this phase, the scanning signal terminal Scan inputs the low level signal, and controls the second switch transistor T2 and the fifth switch transistor T5 to be in the turned-off state; the light emitting signal terminal Em inputs the low level signal, and controls the third switch transistor T3 to be in the turned-off state; the reset signal terminal Rst inputs the high level signal, and controls the first switch transistor T1 and the fourth switch transistor T4 to be in the turned-on state, and the data signal terminal Data inputs the high level signal, and the reference signal terminal Ref is the high level signal terminal VDD.

The first switch transistor T1 which is turned on connects the high level signal terminal VDD with the gates of the first drive transistor M1 and the second drive transistor M2 respectively, so that the gate voltages of the first drive transistor M1 and the second drive transistor M2 are in the high potential, and the first drive transistor M1 and the second drive transistor M2 are turned on.

The fourth switch transistor T4 which is turned on connects the data signal terminal Data with the gate of the third drive transistor M3, so that the voltages at the gate of the third drive transistor M1 and the probe electrode d of the touch sensing capacitor C2 are in the high potential, and the third drive transistor M3 is in the turned-on state.

A second phase is a touch read phase, and during this phase, the light emitting control unit 300 implements the function for charging the data voltage Vdata of the data signal terminal Data into the gates of the first drive transistor M1 and the second drive transistor M2 so as to implement the junming and compensating, and implements the function for outputting the touch detection signal at the touch read terminal Read.

During this phase, the scanning signal terminal Scan inputs the high level signal, and controls the second switch transistor T2 and the fifth switch transistor T5 to be in the turned-on state; the light emitting signal terminal Em inputs the low level signal, and the third switch transistor T3 is in the turned-off state; the reset signal terminal Rst inputs the low level signal, and controls the first switch transistor T1 and the fourth switch transistor T4 to be in the turned-off state, and the data signal terminal Data inputs the high level signal, and the reference signal terminal Ref is the high level signal terminal VDD.

The second switch transistor T2 which is turned on connects the data signal terminal Data with the source of the first drive transistor M1, and since the drain and the gate of the first drive transistor M1 is short circuited, the gates of the first drive transistor M1 and the second drive transistor M2 can be recharged via the first drive transistor M1 until the voltage reaches $Vdata-Vth_1$, which realizes the storing of the threshold voltage $Vth_1$ of the first drive transistor M1.

The fifth switch transistor T5 which is turned on connects the touch read terminal Read with the drain of the third drive transistor M3, and at this point, if the finger touching occurs, the potential at the gate of the third drive transistor M3 would drop, then the third drive transistor would switch from the turned-on state to the turned-off state; that is, if the finger touching occurs, the touch read terminal Read receives the low potential signal, and if there is no finger touching, the touch read terminal Read receives the high potential signal.

A third phase is a light emitting phase, and during this phase, the light emitting control unit 300 implements the function for driving the OLED to emit light with the saturation current of the second drive transistor M2, and the touch detection unit 100 is in the suspension phase, thus the light emitting of the OLED is affected minimally.

During this phase, the scanning signal terminal Scan inputs the low level signal, and controls the second switch transistor T2 and the fifth switch transistor T5 to be in the turned-off state; the light emitting signal terminal Em inputs the high level signal, and the third switch transistor T3 is in the turned-on state; the reset signal terminal Rst inputs the low level signal, and controls the first switch transistor T1 and the fourth switch transistor T4 to be in the turned-off state, and the data signal terminal Data inputs the low level signal, and the reference signal terminal Ref is the high level signal terminal VDD.

The third switch transistor T3 which is turned on connects the drain of the second drive transistor M2 to the OLED to drive the OLED to emit light, and the saturation current outputted from the drain of the second drive transistor M2 is $I_{OLED}=K(V_{GS}-Vth_2)^2=K[Vdd-(Vdata-Vth_1)-Vth_2]^2=K(Vdd-Vdata)^2$, wherein, K is a constant pertaining to the process, $V_{GS}$ is the gate-source voltage of the second drive transistor M2, and $Vth_2$ is the threshold voltage of the second drive transistor M2. It can be seen that the drive current for driving the OLED to emit light by the second drive transistor M2 is only related to the data signal voltage Vdata inputted at the data signal terminal Data and the supply voltage Vdd, and is independent of the threshold voltages $Vth_1$ and $Vth_2$ of the first drive transistor M1 and the second drive transistor M2; thus the affect of the threshold voltages on the OLED can be avoided, that is, if the identical data signals are loaded into the different pixel units, image with identical brightness is obtained, and thus the uniformity of the image brightness in the display area of the display apparatus is improved.

Based on the same inventive concept, embodiments of the present disclosure further provide an organic electroluminescent display panel comprising the above-mentioned pixel circuit according to the embodiment of the present disclosure; since the principle for addressing the problems in the organic electroluminescent display panel is similar to that of the fore-mentioned pixel circuit, the implementation of the organic electroluminescent display panel can be referred to the implementation of the pixel circuit, and the repetitive parts will be omitted.

Figure 12:
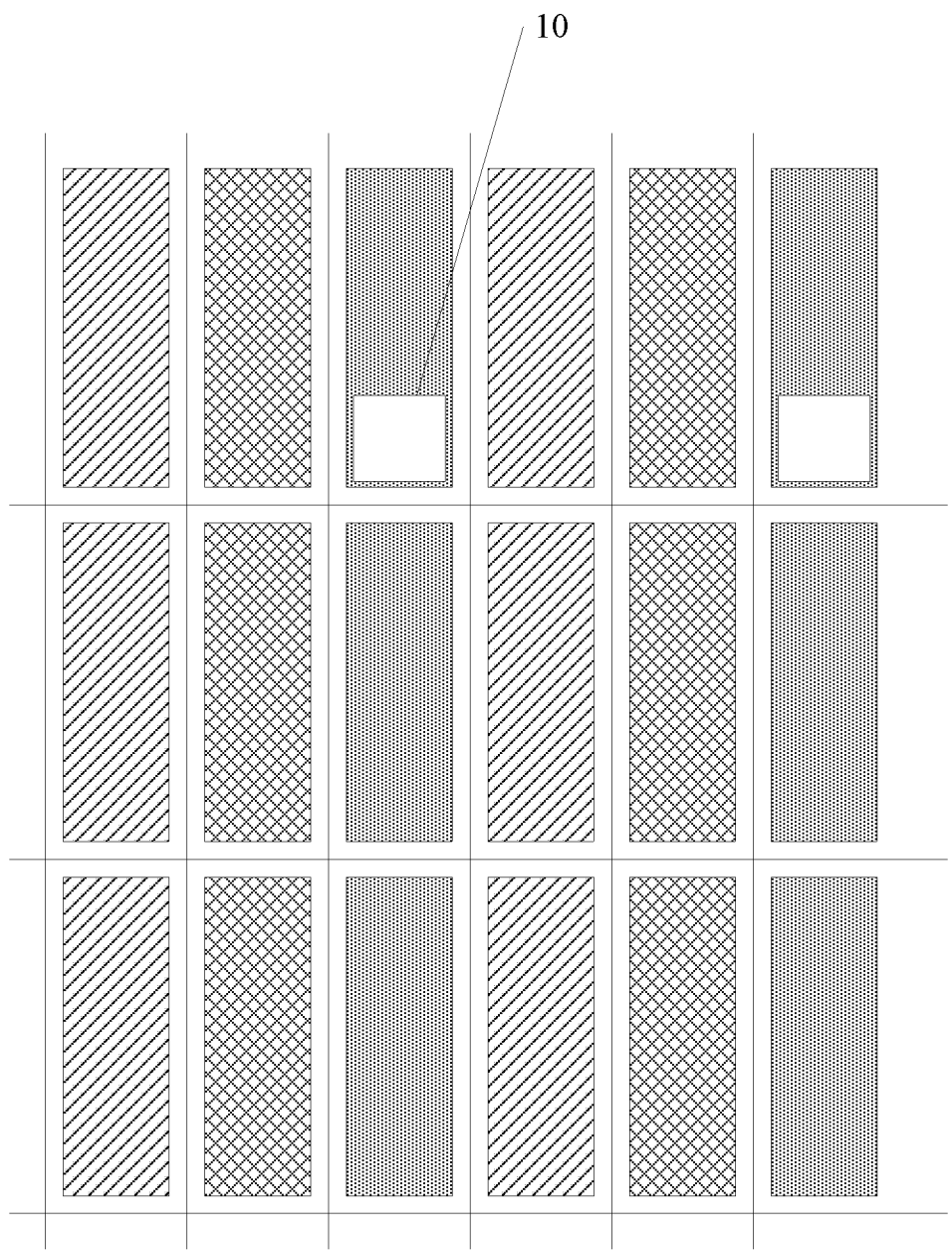
FIG. 12 is a schematic diagram of an organic electroluminescent display panel according to an embodiment of the present disclosure.

As implemented in practice, in designing respective pixel circuits in the organic electroluminescent display panel, the above-mentioned pixel circuits according to the embodiment of the present disclosure may be distributed among the pixel circuits with no touch function on a periodic basis according to the requirements of touch resolution; FIG. 12 shows an example, wherein the explanation is made by taking an case where one pixel circuit according to the embodiment of the present disclosure is inserted per 3×3 array of pixel circuits.

Based on the same inventive concept, embodiments of the present disclosure further provide a display apparatus comprising the above-mentioned organic electroluminescent display panel according to the embodiment of the present disclosure; the display apparatus may be a display, handset, television, notebook, all-in-one machine, etc., and other essential constituent elements of the display apparatus all of which are well known to those skilled in the art will not be repeated here and should not be construed as a limitation of the present disclosure.

According to the pixel circuit, the organic electroluminescent display panel and the display apparatus proposed in the embodiment of the present disclosure, in the pixel circuit, during the reset phase, under the control of the reset signal terminal, the touch detection unit and the light emitting control unit in the pixel circuit are reset respectively; during the touch read phase, under the control of the scanning signal terminal, the touch detection unit outputs the touch detection signal to the touch signal read terminal, so as to implement the touch detection function, meanwhile the light emitting control unit is charged; and during the light emitting phase, under the control of the light emitting signal terminal, the light emitting control unit drives the light emitting device to emit light, so as to implement the display driving function. This pixel circuit integrates the functions of touch detection and displaying, thus the manufacturing cost of disposing the pixel circuit and the touch detection circuit separately can be saved, and the thickness of a display panel can also be reduced. And, in the pixel circuit according to the embodiment of the present disclosure, the touch detection unit and the light emitting control unit share the reset signal terminal, the data signal terminal and the scanning signal terminal, and thus the wiring for ports in the pixel circuit can also be saved.

Obviously, those skilled in the art may make various changes and variations on the present disclosure without departing from the spirit and scope of the present disclosure. Thus, the present disclosure intends to cover the changes and variations to the present disclosure if such changes and variations belong to the scope defined by the claims of the present disclosure and equivalence thereof.

This application claims priority to China Patent Application No. 201410305616.X, filed on Jun. 30, 2014, and the content of which in its entirety is herein incorporated by reference as part of the present application.

What is claimed is:

1. A pixel circuit, comprising: a touch detection unit, a light emitting device and a light emitting control unit; wherein,
    a first input terminal of the touch detection unit is connected with a data signal terminal, a second input terminal of the touch detection unit is connected with a touch signal input terminal, a first control terminal of the touch detection unit is connected with a reset signal terminal, a second control terminal of the touch detection unit is connected with a scanning signal terminal, and an output terminal of the touch detection unit is connected with a touch signal read terminal;
    a first input terminal of the light emitting control unit is connected with the data signal terminal, a second input terminal of the light emitting control unit is connected with a high level signal terminal, a third input terminal of the light emitting control unit is connected with a reference signal terminal, a first control terminal of the light emitting control unit is connected with the reset signal terminal, a second control terminal of the light emitting control unit is connected with the scanning signal terminal, a third control terminal of the light emitting control unit is connected with a light emitting signal terminal, and an output terminal of the light emitting control unit is connected with the light emitting device;
    during a reset phase, under a control of the reset signal terminal, the touch detection unit and the light emitting control unit are reset respectively; during a touch read phase, under a control of the scanning signal terminal, the touch detection unit outputs a touch detection signal to the touch signal read terminal, meanwhile the light emitting control unit is charged; and during a light emitting phase, under a control of the light emitting signal terminal, the light emitting control unit drives the light emitting device to emit light.

2. The pixel circuit as claimed in claim 1, wherein the light emitting control unit comprises: a light emitting control module, a light emitting driving module, a light emitting reset module, and a light emitting charging module; wherein,
    an input terminal of the light emitting control unit, which functions as the third input terminal of the light emitting control unit, is connected with the reference signal terminal, a control terminal of the light emitting reset module, which functions as the first control terminal of the light emitting control unit, is connected with the reset signal terminal, and an output terminal of the light emitting reset module is connected with a control terminal of the light emitting driving module;

an input terminal of the light emitting charging module, which functions as the input terminal of the light emitting control unit, is connected with the data signal terminal, a control terminal of the light emitting charging module, which functions as the second control terminal of the light emitting control unit, is connected with the scanning signal terminal, and an output terminal of the light emitting charging module is connected with a first input terminal of the light emitting driving module; a second input terminal of the light emitting driving module, which functions as the second input terminal of the light emitting control unit, is connected with the high level signal terminal;

an input terminal of the light emitting control module is connected with an output terminal of the light emitting driving module; a control terminal of the light emitting control module, which functions as the third control terminal of the light emitting control unit, is connected with the light emitting signal terminal, and an output terminal of the light emitting control module, which functions as the output terminal of the light emitting control unit, is connected with the light emitting device;

during the reset phase, under the control of the reset signal terminal, the light emitting reset module resets the light emitting driving module; during the touch read phase, under the control of the scanning signal terminal, the light emitting charging module charges the light emitting driving module; and during the light emitting phase, under the control of the light emitting signal terminal, the light emitting control module controls the light emitting driving module to drive the light emitting device to emit light.

3. The pixel circuit as claimed in claim 2, wherein the light emitting driving module comprises: a first drive transistor and a second drive transistor which are set in mirror image, and a memory capacitor; wherein, a source of the first drive transistor is connected with the output terminal of the light emitting charging module;

a drain of the first drive transistor, a gate of the first drive transistor, a gate of the second drive transistor are connected with the output terminal of the light emitting reset module respectively;

a source of the second drive transistor is connected with the high level signal terminal, and a drain of the second drive transistor is connected with the input terminal of the light emitting control module;

when both the first drive transistor and the second drive transistor are P type transistors, the reference signal terminal is a low level signal terminal, and the memory capacitor is connected between the gate and the source of the second drive transistor; and when both the first drive transistor and the second drive transistor are N type transistor, the reference signal terminal is the high level signal terminal, and the memory capacitor is connected between the gate and drain of the second drive transistor.

4. The pixel circuit as claimed in claim 3, wherein the light emitting charging module comprises: a second switch transistor; wherein, a source of the second switch transistor is connected with the data signal terminal, a gate of the second switch transistor is connected with the scanning signal terminal, and a drain of the second switch transistor is connected with the source of the first drive transistor.

5. The pixel circuit as claimed in a claim 3, wherein the light emitting control module comprises: a third switch transistor; wherein, a gate of the third switch transistor is connected with the light emitting signal terminal, a source of the third switch transistor is connected with the drain of the second drive transistor, and a drain of the third switch transistor is connected with the light emitting device.

6. The pixel circuit as claimed in claim 2, wherein the light emitting reset module comprises: a first switch transistor; wherein, a source of the first switch transistor is connected with the reference signal terminal, a gate of the first switch transistor is connected with the reset signal terminal, and a drain of the first switch transistor is the output terminal of the light emitting reset module.

7. The pixel circuit as claimed in claim 1, wherein, the touch detection unit comprises: a touch sensing module, a touch reset module, and a touch control module; wherein, an input terminal of the touch sensing module, which functions as the second input terminal of the touch detection unit, is connected with the touch signal input terminal, a control terminal of the touch sensing module is connected with an output terminal of the touch reset module, and an output terminal of the touch sensing module is connected with an input terminal of the touch control module;

an input terminal of the touch reset module, which functions as the first input terminal of the touch detection unit, is connected with the data signal terminal, a control terminal of the touch reset module, which functions as the first control terminal of the touch detection unit, is connected with the reset signal terminal;

a control terminal of the touch control module, which functions as the second control terminal of the touch detection unit, is connected with the scanning signal terminal; and an output terminal of the touch control module, which functions as the output terminal of the touch detection unit, is connected with the touch signal read terminal;

during the reset phase, under the control of the reset signal terminal, the touch reset module resets the touch sensing module; and during the touch read phase, under the control of the scanning signal terminal, the touch control module controls the touch sensing module to output the touch detection signal to the touch signal read terminal.

8. The pixel circuit as claimed in claim 7, wherein the touch sensing module comprises: a third drive transistor and a touch sensing capacitor; wherein, a drain of the third drive transistor is connected with the input terminal of the touch control module; a source of the third drive transistor is connected with the touch signal input terminal; and a gate of the third drive transistor is connected with the output terminal of the touch reset module; and the touch sensing capacitor is connected between the gate and the source of the third drive transistor.

9. The pixel circuit as claimed in claim 8, wherein the touch reset module comprises: a fourth switch transistor; wherein, a gate of the fourth switch transistor is connected with the reset signal terminal, a source of the fourth switch transistor is connected with the data signal terminal, and a drain of the fourth switch transistor is connected with the gate of the third drive transistor.

10. The pixel circuit as claimed in claim 8, wherein the touch control module comprises: a fifth switch transistor; wherein, a gate of the fifth switch transistor is connected with the scanning signal terminal, a source of the fifth switch transistor is connected with the drain of the third drive transistor, and a drain of the fifth switch transistor is connected with the touch signal read terminal.

11. An organic electroluminescent display panel, comprising a pixel circuit, wherein the pixel circuit comprises: a touch detection unit, a light emitting device and a light emitting control unit; wherein, a first input terminal of the touch detection unit is connected with a data signal terminal, a second input terminal of the touch detection unit is connected with a touch signal input terminal, a first control terminal of the touch detection unit is connected with a reset signal terminal, a second control terminal of the touch detection unit is connected with a scanning signal terminal, and an output terminal of the touch detection unit is connected with a touch signal read terminal;

a first input terminal of the light emitting control unit is connected with the data signal terminal, a second input terminal of the light emitting control unit is connected with a high level signal terminal, a third input terminal of the light emitting control unit is connected with a reference signal terminal, a first control terminal of the light emitting control unit is connected with the reset signal terminal, a second control terminal of the light emitting control unit is connected with the scanning signal terminal, a third control terminal of the light emitting control unit is connected with a light emitting signal terminal, and an output terminal of the light emitting control unit is connected with the light emitting device;

during a reset phase, under a control of the reset signal terminal, the touch detection unit and the light emitting control unit are reset respectively; during a touch read phase, under a control of the scanning signal terminal, the touch detection unit outputs a touch detection signal to the touch signal read terminal, meanwhile the light emitting control unit is charged; and during a light emitting phase, under a control of the light emitting signal terminal, the light emitting control unit drives the light emitting device to emit light.

12. The organic electroluminescent display panel as claimed in claim 11, wherein the light emitting control unit comprises: a light emitting control module, a light emitting driving module, a light emitting reset module, and a light emitting charging module; wherein, an input terminal of the light emitting control unit, which functions as the third input terminal of the light emitting control unit, is connected with the reference signal terminal, a control terminal of the light emitting reset module, which functions as the first control terminal of the light emitting control unit, is connected with the reset signal terminal, and an output terminal of the light emitting reset module is connected with a control terminal of the light emitting driving module;

an input terminal of the light emitting charging module, which functions as the input terminal of the light emitting control unit, is connected with the data signal terminal, a control terminal of the light emitting charging module, which functions as the second control terminal of the light emitting control unit, is connected with the scanning signal terminal, and an output terminal of the light emitting charging module is connected with a first input terminal of the light emitting driving module; a second input terminal of the light emitting driving module, which functions as the second input terminal of the light emitting control unit, is connected with the high level signal terminal;

an input terminal of the light emitting control module is connected with an output terminal of the light emitting driving module; a control terminal of the light emitting control module, which functions as the third control terminal of the light emitting control unit, is connected with the light emitting signal terminal, and an output terminal of the light emitting control module, which functions as the output terminal of the light emitting control unit, is connected with the light emitting device;

during the reset phase, under the control of the reset signal terminal, the light emitting reset module resets the light emitting driving module; during the touch read phase, under the control of the scanning signal terminal, the light emitting charging module charges the light emitting driving module; and during the light emitting phase, under the control of the light emitting signal terminal, the light emitting control module controls the light emitting driving module to drive the light emitting device to emit light.

13. The organic electroluminescent display panel as claimed in claim 12, wherein the light emitting driving module comprises: a first drive transistor and a second drive transistor which are set in mirror image, and a memory capacitor; wherein, a source of the first drive transistor is connected with the output terminal of the light emitting charging module;

a drain of the first drive transistor, a gate of the first drive transistor, a gate of the second drive transistor are connected with the output terminal of the light emitting reset module respectively;

a source of the second drive transistor is connected with the high level signal terminal, and a drain of the second drive transistor is connected with the input terminal of the light emitting control module;

when both the first drive transistor and the second drive transistor are P type transistors, the reference signal terminal is a low level signal terminal, and the memory capacitor is connected between the gate and the source of the second drive transistor; and when both the first drive transistor and the second drive transistor are N type transistor, the reference signal terminal is the high level signal terminal, and the memory capacitor is connected between the gate and drain of the second drive transistor.

14. The organic electroluminescent display panel as claimed in claim 11, wherein, the touch detection unit comprises: a touch sensing module, a touch reset module, and a touch control module; wherein, an input terminal of the touch sensing module, which functions as the second input terminal of the touch detection unit, is connected with the touch signal input terminal, a control terminal of the touch sensing module is connected with an output terminal of the touch reset module, and an output terminal of the touch sensing module is connected with an input terminal of the touch control module;

an input terminal of the touch reset module, which functions as the first input terminal of the touch detection unit, is connected with the data signal terminal, a control terminal of the touch reset module, which functions as the first control terminal of the touch detection unit, is connected with the reset signal terminal;

a control terminal of the touch control module, which functions as the second control terminal of the touch detection unit, is connected with the scanning signal terminal; and an output terminal of the touch control module, which functions as the output terminal of the touch detection unit, is connected with the touch signal read terminal;

during the reset phase, under the control of the reset signal terminal, the touch reset module resets the touch sensing module; and during the touch read phase, under the control of the scanning signal terminal, the touch control module controls the touch sensing module to output the touch detection signal to the touch signal read terminal.

15. The organic electroluminescent display panel as claimed in claim 14, wherein the touch sensing module comprises: a third drive transistor and a touch sensing capacitor; wherein, a drain of the third drive transistor is connected with the input terminal of the touch control module; a source of the third drive transistor is connected with the touch signal input terminal; and a gate of the third drive transistor is connected with the output terminal of the touch reset module; and the touch sensing capacitor is connected between the gate and the source of the third drive transistor.

16. A display apparatus, comprising an organic electroluminescent display panel including a pixel circuit, the pixel circuit comprises: a touch detection unit, a light emitting device and a light emitting control unit; wherein, a first input terminal of the touch detection unit is connected with a data signal terminal, a second input terminal of the touch detection unit is connected with a touch signal input terminal, a first control terminal of the touch detection unit is connected with a reset signal terminal, a second control terminal of the touch detection unit is connected with a scanning signal terminal, and an output terminal of the touch detection unit is connected with a touch signal read terminal;

a first input terminal of the light emitting control unit is connected with the data signal terminal, a second input terminal of the light emitting control unit is connected with a high level signal terminal, a third input terminal of the light emitting control unit is connected with a reference signal terminal, a first control terminal of the light emitting control unit is connected with the reset signal terminal, a second control terminal of the light emitting control unit is connected with the scanning signal terminal, a third control terminal of the light emitting control unit is connected with a light emitting signal terminal, and an output terminal of the light emitting control unit is connected with the light emitting device;

during a reset phase, under a control of the reset signal terminal, the touch detection unit and the light emitting control unit are reset respectively; during a touch read phase, under a control of the scanning signal terminal, the touch detection unit outputs a touch detection signal to the touch signal read terminal, meanwhile the light emitting control unit is charged; and during a light emitting phase, under a control of the light emitting signal terminal, the light emitting control unit drives the light emitting device to emit light.

17. The display apparatus as claimed in claim 16, wherein the light emitting control unit comprises: a light emitting control module, a light emitting driving module, a light emitting reset module, and a light emitting charging module; wherein, an input terminal of the light emitting control unit, which functions as the third input terminal of the light emitting control unit, is connected with the reference signal terminal, a control terminal of the light emitting reset module, which functions as the first control terminal of the light emitting control unit, is connected with the reset signal terminal, and an output terminal of the light emitting reset module is connected with a control terminal of the light emitting driving module;

an input terminal of the light emitting charging module, which functions as the input terminal of the light emitting control unit, is connected with the data signal terminal, a control terminal of the light emitting charging module, which functions as the second control terminal of the light emitting control unit, is connected with the scanning signal terminal, and an output terminal of the light emitting charging module is connected with a first input terminal of the light emitting driving module; a second input terminal of the light emitting driving module, which functions as the second input terminal of the light emitting control unit, is connected with the high level signal terminal;

an input terminal of the light emitting control module is connected with an output terminal of the light emitting driving module; a control terminal of the light emitting control module, which functions as the third control terminal of the light emitting control unit, is connected with the light emitting signal terminal, and an output terminal of the light emitting control module, which functions as the output terminal of the light emitting control unit, is connected with the light emitting device;

during the reset phase, under the control of the reset signal terminal, the light emitting reset module resets the light emitting driving module; during the touch read phase, under the control of the scanning signal terminal, the light emitting charging module charges the light emitting driving module; and during the light emitting phase, under the control of the light emitting signal terminal, the light emitting control module controls the light emitting driving module to drive the light emitting device to emit light.

18. The display apparatus as claimed in claim 17, wherein the light emitting driving module comprises: a first drive transistor and a second drive transistor which are set in mirror image, and a memory capacitor; wherein, a source of the first drive transistor is connected with the output terminal of the light emitting charging module;

a drain of the first drive transistor, a gate of the first drive transistor, a gate of the second drive transistor are connected with the output terminal of the light emitting reset module respectively;

a source of the second drive transistor is connected with the high level signal terminal, and a drain of the second drive transistor is connected with the input terminal of the light emitting control module;

when both the first drive transistor and the second drive transistor are P type transistors, the reference signal terminal is a low level signal terminal, and the memory capacitor is connected between the gate and the source of the second drive transistor; and when both the first drive transistor and the second drive transistor are N type transistor, the reference signal terminal is the high level signal terminal, and the memory capacitor is connected between the gate and drain of the second drive transistor.

19. The display apparatus as claimed in claim 16, wherein, the touch detection unit comprises: a touch sensing module, a touch reset module, and a touch control module; wherein, an input terminal of the touch sensing module, which functions as the second input terminal of the touch detection unit, is connected with the touch signal input terminal, a control terminal of the touch sensing module is connected with an output terminal of the touch reset module, and an output terminal of the touch sensing module is connected with an input terminal of the touch control module;

an input terminal of the touch reset module, which functions as the first input terminal of the touch detection unit, is connected with the data signal terminal, a control terminal of the touch reset module, which functions as the first control terminal of the touch detection unit, is connected with the reset signal terminal;

a control terminal of the touch control module, which functions as the second control terminal of the touch detection unit, is connected with the scanning signal terminal; and an output terminal of the touch control module, which functions as the output terminal of the touch detection unit, is connected with the touch signal read terminal;

during the reset phase, under the control of the reset signal terminal, the touch reset module resets the touch sensing module; and during the touch read phase, under the control of the scanning signal terminal, the touch control module controls the touch sensing module to output the touch detection signal to the touch signal read terminal.

20. The pixel circuit as claimed in claim 19, wherein the touch sensing module comprises: a third drive transistor and a touch sensing capacitor; wherein, a drain of the third drive transistor is connected with the input terminal of the touch control module; a source of the third drive transistor is connected with the touch signal input terminal; and a gate of the third drive transistor is connected with the output terminal of the touch reset module; and the touch sensing capacitor is connected between the gate and the source of the third drive transistor.

\* \* \* \* \*